US009781395B2

United States Patent
Ishikawa et al.

(10) Patent No.: US 9,781,395 B2
(45) Date of Patent: *Oct. 3, 2017

(54) PROJECTION SYSTEM, IMAGE PROCESSING APPARATUS, AND COMPUTER-READABLE STORAGE MEDIUM

(71) Applicant: RICOH COMPANY, LTD., Tokyo (JP)

(72) Inventors: Masaaki Ishikawa, Kanagawa (JP); Yukinaka Uchiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,447

(22) Filed: May 26, 2016

(65) Prior Publication Data

US 2016/0353068 A1 Dec. 1, 2016

(30) Foreign Application Priority Data

May 28, 2015 (JP) ................................ 2015-108607

(51) Int. Cl.
H04N 9/31 (2006.01)
(52) U.S. Cl.
CPC ......... H04N 9/3147 (2013.01); H04N 9/3185 (2013.01); H04N 9/3191 (2013.01)
(58) Field of Classification Search
USPC ................................................ 348/744, 745
See application file for complete search history.

(56) References Cited

U.S. PATENT DOCUMENTS

| 6,151,122 | A | * | 11/2000 | Taniguchi | G03F 7/70358 356/399 |
| 6,169,602 | B1 | * | 1/2001 | Taniguchi | G03F 7/70358 356/399 |
| 7,237,911 | B2 | * | 7/2007 | Yamada | G03B 21/56 348/383 |
| 7,496,241 | B1 | * | 2/2009 | Reneker | G01C 11/02 382/260 |
| 7,751,645 | B2 | * | 7/2010 | Reneker | G01C 11/02 382/274 |

(Continued)

FOREIGN PATENT DOCUMENTS

JP 3908255 1/2007
JP 2015-158658 9/2015

*Primary Examiner* — Paulos M Natnael
(74) *Attorney, Agent, or Firm* — Oblon, McClelland, Maier & Neustadt, L.L.P.

(57) ABSTRACT

A projection system includes a plurality of projection units configured to project an image as a whole; a receiver configured to receive an instruction for shifting reference points that define a projection target area onto which the plurality of projection units project the whole image on an occasion of an initial calibration processing; a storage unit configured to store the reference points of the projection target area used in the initial calibration processing; a controller configured to start a recalibration processing in response to an event; a setting unit configured to reset the projection target area based on the reference points stored in the storage unit on an occasion of the recalibration processing; and a correction coefficient calculator configured to calculate correction coefficients for the plurality of projection units based on the projection target area that is reset by the setting unit.

7 Claims, 18 Drawing Sheets

(56) References Cited

U.S. PATENT DOCUMENTS

| | | |
|---|---|---|
| 2013/0222776 A1 | 8/2013 | Ishikawa |
| 2014/0268065 A1 | 9/2014 | Ishikawa et al. |
| 2015/0029465 A1* | 1/2015 | Ishikawa ................ G06T 3/005 |
| | | 353/30 |
| 2015/0077573 A1 | 3/2015 | Ishikawa et al. |
| 2015/0213584 A1 | 7/2015 | Ishikawa et al. |
| 2016/0295184 A1 | 10/2016 | Ishikawa et al. |

* cited by examiner

FIG.16

| PROJECTOR COORDINATES (INTEGER) | | CONTENT COORDINATES (DECIMAL POINT NUNBER) | | PROJECTOR COORDINATES (INTEGER) | | BLENDING COEFFICIENT | |
|---|---|---|---|---|---|---|---|
| X | Y | X | Y | X | Y | | |
| 0 | 0 | ... | ... | 0 | 0 | ... | ... |
| 1 | 0 | ... | ... | 1 | 0 | ... | ... |
| 2 | 0 | ... | ... | 2 | 0 | ... | ... |
| ⋮ | 0 | ... | ... | ⋮ | 0 | ... | ... |
| 1279 | 0 | ... | ... | 1279 | 0 | ... | ... |
| 0 | 1 | ... | ... | 0 | 1 | ... | ... |
| 1 | 1 | ... | ... | 1 | 1 | ... | ... |
| 2 | 1 | ... | ... | 2 | 1 | ... | ... |
| ⋮ | ⋮ | ... | ... | ⋮ | ⋮ | ... | ... |
| 1277 | 799 | ... | ... | 1277 | 799 | ... | ... |
| 1278 | 799 | ... | ... | 1278 | 799 | ... | ... |
| 1279 | 799 | ... | ... | 1279 | 799 | ... | ... |

(A)  (B)

PROJECTION SYSTEM, IMAGE PROCESSING APPARATUS, AND COMPUTER-READABLE STORAGE MEDIUM

CROSS-REFERENCE TO RELATED APPLICATION

The present application claims priority under 35 U.S.C. §119 to Japanese Patent Application No. 2015-108607, filed May 28, 2015. The contents of which are incorporated herein by reference in their entirety.

BACKGROUND OF THE INVENTION

1. Field of the Invention

The present invention relates to a projection system, an image processing apparatus, and a computer-readable storage medium.

2. Description of the Related Art

In recent years, a multi-projection technique of arranging projection images from multiple projectors with overlapping areas intervening among the images and projecting a single high-resolution image onto a screen has received an attention.

As for the multi-projection technique explained above, Japanese Patent No. 3908255 has been known, for example. In an information projection system in Japanese Patent No. 3908255, a reference image including at least four feature points whose respective coordinate positions are known in advance is projected onto a screen by each projector in calibration. Here, the reference image is, for example, a known image with a grid pattern in which bright spots or cross shapes are aligned at regular intervals. Respective positions of the feature points in the reference image captured by a digital camera are detected, a projection image for each projector is deformed based on the detected positions of the at least four feature points of each projector, an overlapping area is detected, and a blending processing is performed. It is possible, by projecting the images after the deformation and the blending processing from the multiple projectors while aligning the images on the screen with overlapping areas intervening with each other, to project a single high-resolution image.

In a case of a usage as a permanent signage, positional displacement of a projector is inevitable with the passage of time due to a vibration even after the projector is once installed and adjusted in position and a slight displacement causes a significant deterioration in quality of the image. Therefore, it is necessary that a person in charge frequently goes to an actual place where the projector is installed permanently and checks the presence of a displacement, a technical expert having a maintenance skill is called when a displacement is recognized, and a calibration processing is performed by preparing a camera and a tripod again in the projection system in the conventional technique, which is cumbersome.

Under this background, demanded has been a development of a technique that enables an easy recalibration of a minute misalignment, attributed to a positional displacement with the passage of time, in a connection part of projection images in recalibration after an initial calibration without time and effort for the setting of a camera and a tripod and a manual fine adjustment again.

SUMMARY OF THE INVENTION

According to one aspect of the present invention, a projection system includes a plurality of projection units configured to project an image as a whole; a receiver configured to receive an instruction for shifting reference points that define a projection target area onto which the plurality of projection units project the whole image on an occasion of an initial calibration processing; a storage unit configured to store the reference points of the projection target area used in the initial calibration processing; a controller configured to start a recalibration processing in response to an event; a setting unit configured to reset the projection target area based on the reference points stored in the storage unit on an occasion of the recalibration processing; and a correction coefficient calculator configured to calculate correction coefficients for the plurality of projection units based on the projection target area that is reset by the setting unit.

BRIEF DESCRIPTION OF THE DRAWINGS

FIG. 16 illustrates an example of a data structure of (A) the geometric correction coefficient and (B) the blending coefficient;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
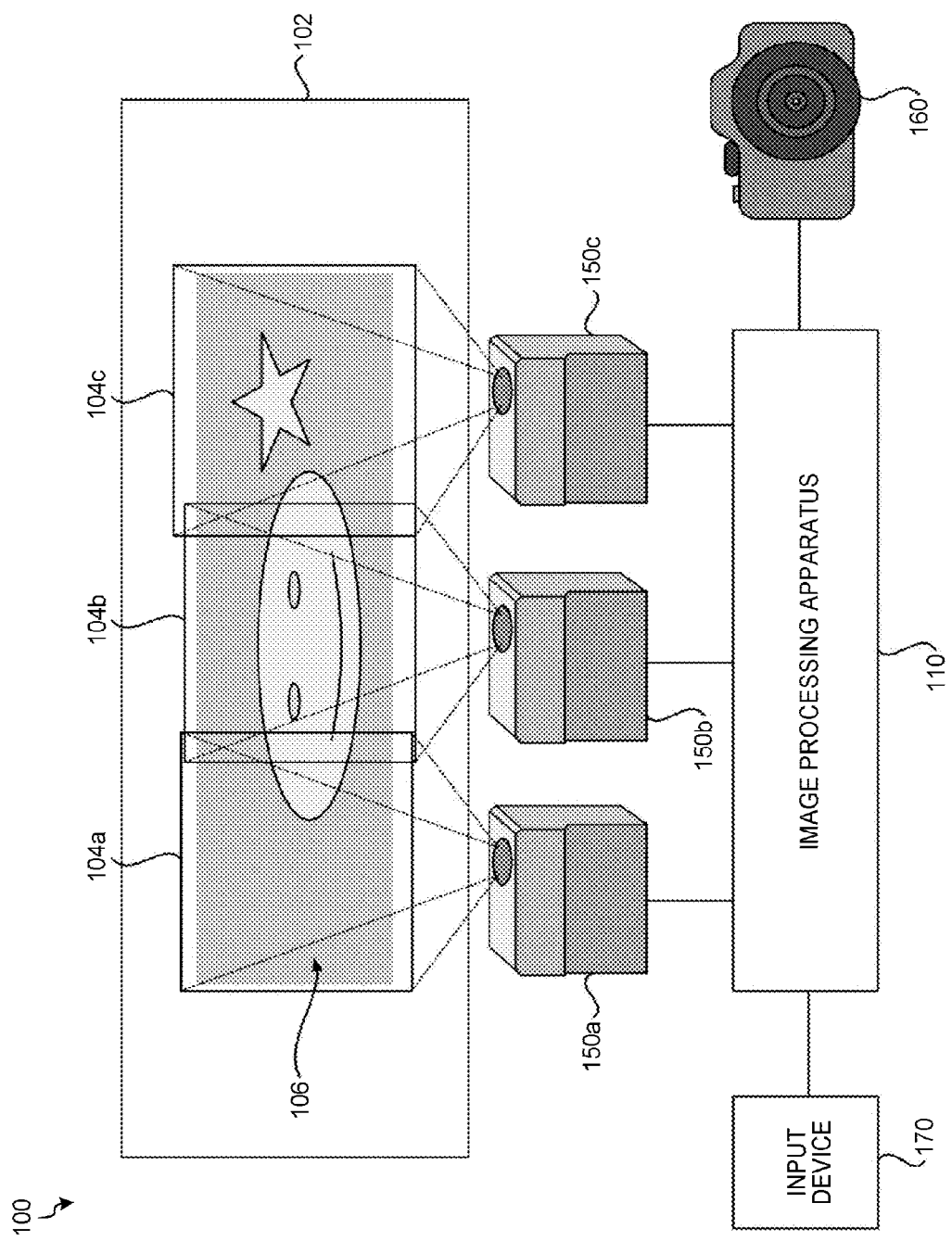
FIG. 1 is a schematic view of an entire configuration of a projection system according to an embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

While an exemplary embodiment of the present invention will be explained below, the present invention is not limited to the embodiment explained below. The embodiment below will be explained by using, as an example of a projection system, a projection system 100 provided with multiple projectors 150 as projection units, one camera 160 as an imaging unit, and an image processing apparatus 110 that performs an entire control.

Entire configuration

FIG. 1 is a schematic view of an entire configuration of a projection system 100 according to an embodiment. The projection system 100 illustrated in FIG. 1 is provided with the image processing apparatus 110 that performs an entire control of the system, the multiple projectors 150, the camera 160, and an input device 170. The projection system 100 according to the embodiment is assumed to have a configuration supporting a so-called multi-projection in which projection images of three projectors 150a to 150c are synthesized on a projection plane and an image is projected onto a larger area compared with a case with a single projector, though not being limited especially thereto.

The image processing apparatus 110 is typically configured as a universal computer such as a personal computer and a workstation. The image processing apparatus 110 is not limited to a universal computer, may be implemented as a dedicated controller, may be embedded in any one of the projectors 150, or may be embedded in a device such as a tablet computer.

Each projector 150 is a projection device that adopts a liquid crystal system, a DLP (digital Light Processing) system, an LCOS (Liquid Crystal On Silicon) system, and the like. The camera 160 is an imaging device that includes an image sensor such as a CMOS (Complementary Metal Oxide Semiconductor) and a CCD (Charge Coupled Device) and an image forming optical system such as a lens that forms an image on a light reception area of the image sensor. The camera 160 may be configured as a dedicated device such as a WEB (World Wide Web) camera, a digital still camera, and a digital video camera, and is preferably provided permanently in a manner of being hung from the ceiling.

The input device 170, which is an input device such as a mouse, a keyset, a touch sensitive panel, and an operation panel, is capable of receiving an instruction from a user. The input device 170 can be used in fine adjustment in a result or an interim result of correction error. The input device 170 may be configured as a device connected to the image processing apparatus 110, the projector 150, or the camera 160, or may be configured as a device embedded in those devices.

In the projection system 100, a projection body that provides a projection area is, for example, a wall 102. The wall 102 provides a projection area in a manner of not clearly specifying a boundary between a projection target and a background like a screen in the embodiment to be explained. The projectors 150 are arranged in a manner of providing respective projections on the wall 102 while respective center positions for projection are displaced. The image processing apparatus 110 generates multiple projection images to be projected by the multiple projectors 150a to 150c and outputs respective projection images to respective projectors 150. Each projector 150 projects a projection image input from the image processing apparatus 110 on the wall 102. On the wall 102, multiple projection images 104a to 104c respectively from the multiple projectors 150a to 150c are projected as illustrated in FIG. 1. The multiple projection images 104a to 104c are overlapped on the projection plane and synthesized into a single projection image 106 on the wall 102.

In the projection system 100, a calibration processing is normally performed before a projection mode. The camera 160 illustrated in FIG. 1 is used in this calibration processing. The image processing apparatus 110 outputs respective images for calibration (hereinafter referred to as "calibration-purpose images") to the multiple projectors 150 during the calibration mode to cause the projectors 150 to project respective projection images (hereinafter the projected calibration-purpose images are referred to as "calibration-purpose projection images") on the wall 102. The point of view and the field of view of the camera 160 are set so that the calibration-purpose projection images projected by the projectors 150 on the wall 102 fit within an angle of view, and a calibration-purpose imaging is then to be performed. The image processing apparatus 110 uses at least one captured image (hereinafter a captured image capturing the calibration-purpose projection image is referred to as "calibration-purpose captured image") to perform the calibration processing and perform a projection while adjusting a content image based on a result of the calibration after a completion of the calibration.

Figure 2:
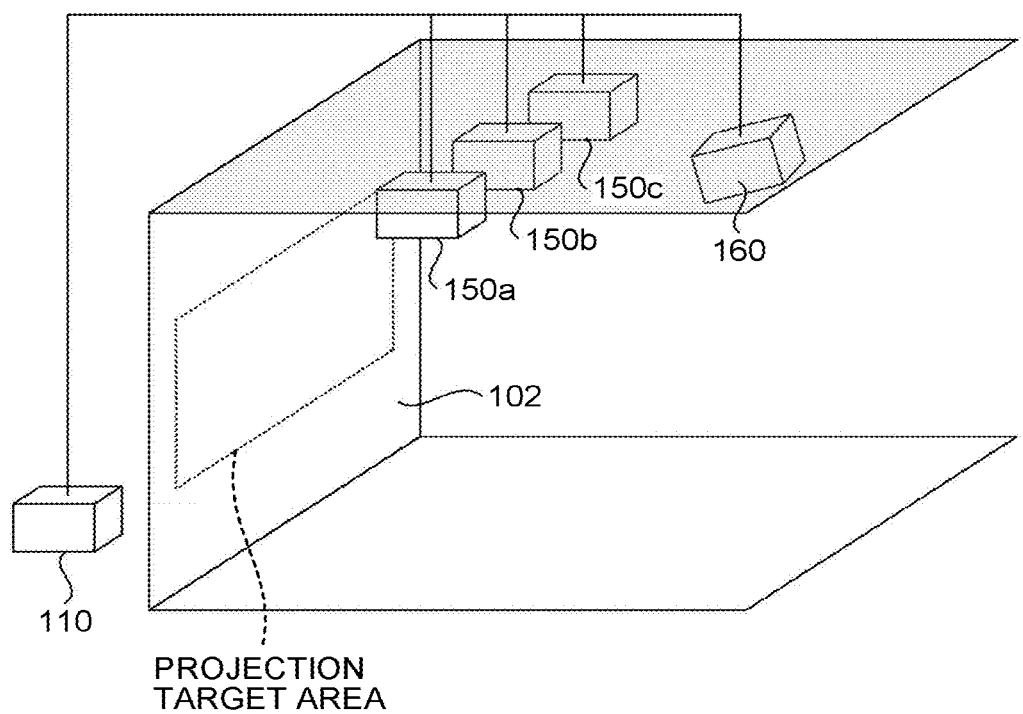
FIG. 2 illustrates an installation example of a wall, an image processing apparatus, projectors, and a camera in the projection system according to the embodiment.

FIG. 2 illustrates an installation example of the wall 102, the image processing apparatus 110, the projectors 150, and the camera 160 in the projection system 100 according to the embodiment. FIG. 2 illustrates an installation example in which the camera 160 is permanently arranged by being hung from the ceiling.

During the calibration mode, a user normally performs a manual adjustment visually so that connected projection images fit within a virtual projection target area which serves as a target of the projection on the wall 102 (the boundary of the projection target area is not necessarily specified in the case of the wall). In a case of a usage as a permanent signage, it is inevitable that the projector is displaced in position with the passage of time due to a vibration and the like even after the installation and the adjustment once. As illustrated in FIG. 2, the problem is not significant as far as the projection images get misaligned as a whole when a rough positioning is performed so that the connected projection images fit within the projection target area on the wall 102. However, since positional displacement with the passage of time normally arises individually in each projector 150, there is a possibility of significantly degrading the quality of an image including a case where a character overlaps with each other in the overlapping part even when the misalignment in the connection part of the projection images is as minute as a few pixels. Especially in using a short focus projector, the problem becomes significant. Under the background explained above, it is demanded to easily perform a recalibration of such minute misalignment without time and effort for setting of the camera on the tripod and a manual re-fine adjustment in the recalibration after the projection images are connected and projected onto the projection target area through the initial calibration work.

In the present embodiment, on the occasion of the initial calibration processing, the projection system 100 receives an instruction for shifting reference points that define the projection target area (the boundary is not necessarily specified clearly since being a virtual projection target area in the example in FIGS. 1 and 2) onto which multiple projectors (projectors 150a to 150c in the example illustrated in FIGS. 1 and 2) project respective images as a whole, and stores the reference points of the projection target area used in the initial calibration processing. In response to an event, a recalibration processing is started, the projection target area is reset based on the stored reference points on the occasion of the recalibration processing, and correction coefficients with respect to the multiple projectors 150 are calculated.

With this configuration, it is possible, in the projection system in which the multiple projectors 150 are used to project a collective image, to easily perform a recalibration of a minute misalignment, attributed to a positional displacement with the passage of time, in a connection part of the projection images without time and effort for the setting of the camera on the tripod and a manual re-fine adjustment in the recalibration after the initial calibration.

Functional configuration

Figure 3:
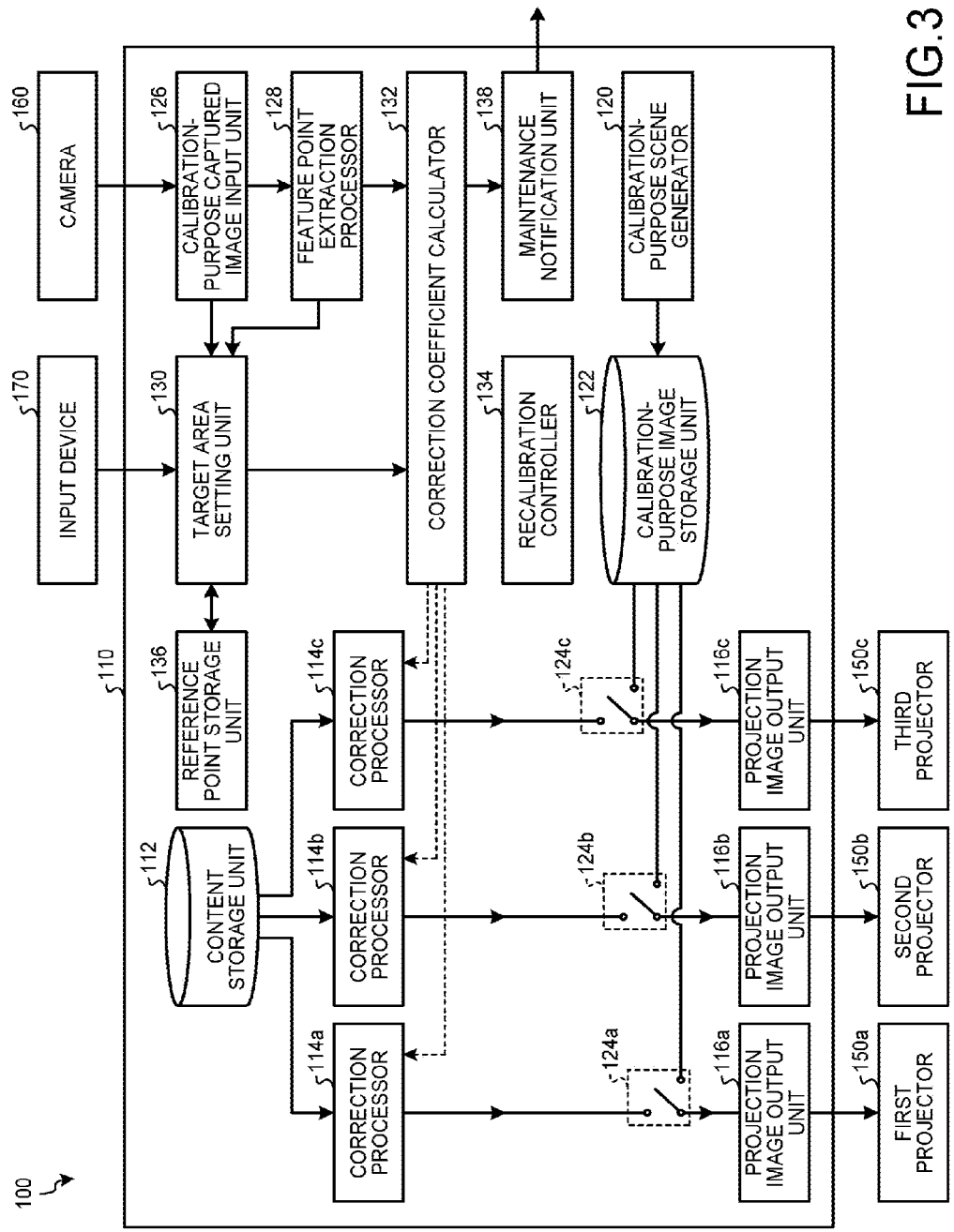
FIG. 3 is a functional block diagram of the projection system according to the embodiment.

FIG. 3 is a functional block diagram of the projection system 100 according to the embodiment. The image processing apparatus 110 is provided with a content storage unit 112 and correction processors 114a to 114c, projection image output units 116a to 116c, and switching units 124a to 124c for respective projectors. The image processing apparatus 110 is further provided with a calibration-purpose scene generator 120, a calibration-purpose image storage unit 122, a calibration-purpose captured image input unit 126, a feature point extraction processor 128, a target area setting unit 130, and a correction coefficient calculator 132.

The content storage unit 112 stores a content image, as a signal source, to be projected as a single projection image 106. The content storage unit 112 is configured as a storage area such as a RAM (Random Access Memory), an HDD (Hard Disk Drive), an SSD (Solid State Drive), and a detachable removable medium.

The content image as a projection target is not specifically limited, may be provided as a still image file, may be provided as a display screen to be generated by an execution by an application such as a presentation and an operating system, and may be provided as a frame at a given timing in a moving image file. A case where the content image is provided as a still image will be taken as an example and explained below for the convenience of explanation.

The correction processors 114a to 114c are provided respectively for the projectors 150a to 150c included in the system 100. The correction processor 114 each reads out the content image from the content storage unit 112, performs a correction processing, and generates a projection image for a corresponding projector.

The projection image output units 116a to 116c are provided respectively for the projectors 150a to 150c included in the system 100. The projection image output unit 116 each is provided with a display output interface which is connected to a corresponding projector 150 and outputs an input image selected by the switching unit 124 to the connected projector 150.

The switching units 124a to 124c switch a flow of an image signal depending on the operation mode of the system 100. The switching unit 124 switches to an output from the correction processor 114 during the projection mode in which the content image is projected and switches to an output from the calibration-purpose image storage unit 122 during the calibration mode.

The calibration-purpose image storage unit 122 stores calibration-purpose images to be projected from respective projectors 150 during the calibration mode. The calibration-purpose image storage unit 122 is configured as a storage area such as a RAM, an HDD, an SSD, and a detachable removable medium.

In the calibration processing according to the embodiment, an imaging is performed more than once for the purpose of calibration. The image processing apparatus 110 reads out respective calibration-purpose images from the calibration-purpose image storage unit 122 and causes the multiple projectors 150a to 150c to output the respective images at a right time. On this occasion, the image processing apparatus 110 grasps positional relationship of the projection images of the multiple projectors 150 and performs a projection by selecting the calibration-purpose images depending on each step of the calibration processing so as to obtain a calibration result in just proportion of all the projectors 150 as a whole. A scene configured when each projector projects an image at each step of the calibration processing is referred to as "calibration-purpose projection scene" below.

The calibration-purpose image constituting each calibration-purpose projection scene explained above is generated by the calibration-purpose scene generator 120 representatively as a still image. The calibration-purpose scene generator 120 generates an optimized calibration-purpose image for each projector 150 based on an input, by a user, of conditions for installation and conditions for projection of the projector 150. Conditions for installation may include a condition that three projectors 150 are installed, for example. Conditions for projection may include a condition that the projection is performed onto a screen whose boundary is unclear, onto a wall without a boundary, or onto a screen whose boundary is clearly defined, for example.

Figure 4:
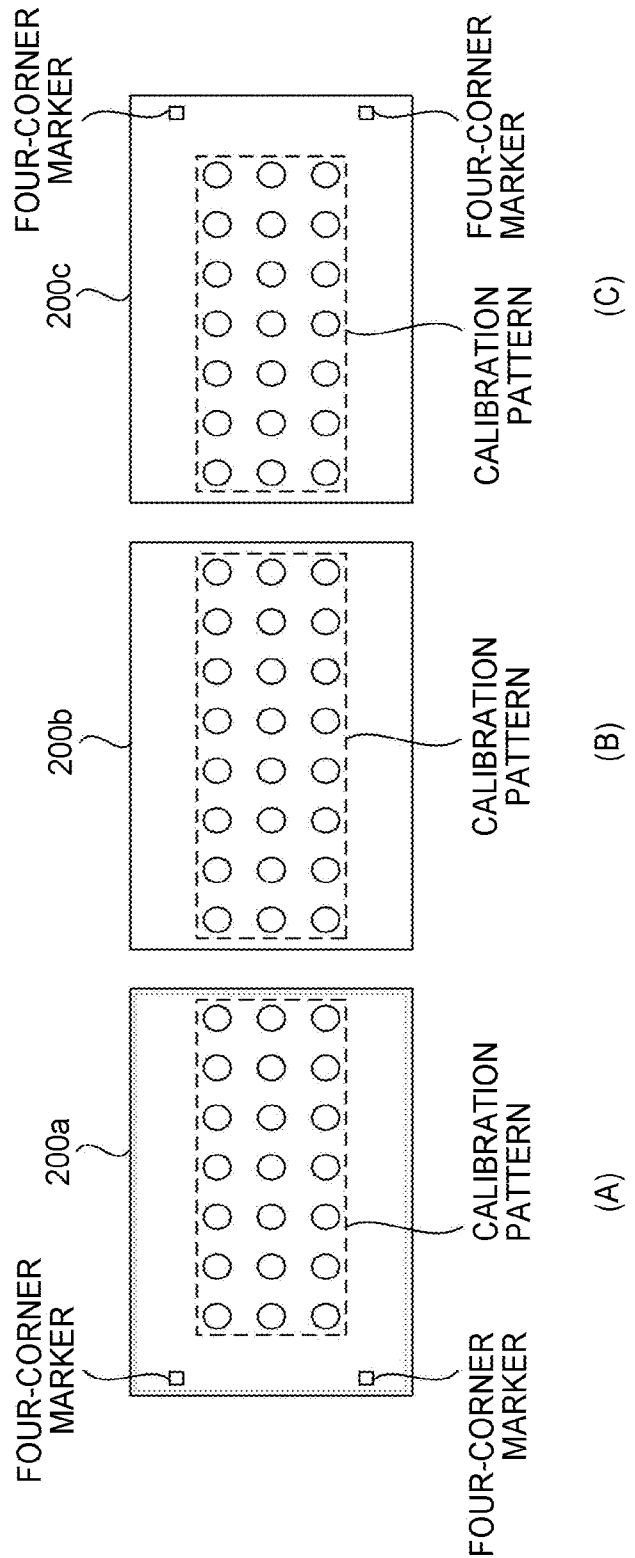
FIG. 4 illustrates examples of three calibration-purpose images to be generated for three projectors whose respective projection images are horizontally aligned in line in the embodiment.

In FIG. 4, (A) to (C) exemplify three calibration-purpose images to be generated with respect to the three projectors 150a to 150c whose respective projection images are aligned horizontally in line in the embodiment. As illustrated in FIG. 4, a calibration-purpose image includes an array of a calibration pattern that defines calibration points that allow detecting a distortion of a projection image. The array of the calibration pattern defines coordinates on a projector memory and configured as a pattern in which given graphic elements are arranged in a predetermined order. The projected calibration pattern array is imaged by the camera 160, a set of the calibration points is extracted, and the coordinates are detected, so that a trapezoidal distortion and a local distortion of the projection image in each projector is detected.

At least in the calibration-purpose images to be generated for the projectors 150a and 150c which are assigned to corner areas and locate at the left side and right side ends, four-corner markers are additionally provided in an outside area of the array of the calibration pattern. The four-corner markers serve as a rough indication for positioning four corners of the projection target area (an area assumed by an installation personnel in the case of a wall and the like), and it is only necessary for the user to adjust a projection angle and a zoom of the multiple projectors 150 so that the four-corner markers projected fall within a predetermined area.

The four-corner markers configure a positioning marker that serves as a rough indication for positioning in the embodiment. Here, while the four-corner markers are included in the calibration-purpose images for the projectors 150a and 150c assigned to the corner areas in the embodiment, it is not intended to discourage a configuration in which the four-corner markers are provided in the four corners in each of the calibration-purpose images for the projectors 150a, 150b, and 150c. The projection image output units 116a and 116c that output, to the projectors 150a and 150c preferably assigned to at least corner areas, the calibration-purpose images including the generated four-corner markers during the calibration mode configure an output unit in the embodiment.

With reference to FIG. 3 again, the camera 160 is secured so that the projected calibration-purpose projection images fall within the angle of view and captures the projected calibration-purpose projection image for each calibration-purpose projection scene. Each calibration-purpose captured image imaged by the camera 160 is transmitted to the image processing apparatus 110 via a wireless connection such as a wireless LAN (Local Area Network), the Bluetooth®, and a wireless USB (Universal Serial Bus) or a wired connection such as a wired USB and a wired LAN. Alternatively, the captured image is read out by the image processing apparatus 110 via a removable medium such as SD Card® and CompactFlash®. The calibration-purpose captured image input unit 126 receives an input, from the camera 160, of captured images. The calibration-purpose captured images input to the calibration-purpose captured image input unit 126 are passed to the feature point extraction processor 128.

The feature point extraction processor 128 extracts calibration points of the array of the calibration pattern and detection points of the four-corner markers from each of the at least one calibration-purpose captured image. Coordinate information of the calibration points extracted by the feature point extraction processor 128 is passed to the correction coefficient calculator 132. Coordinate information of the detection points of the four-corner markers extracted by the feature point extraction processor 128 is passed to the target area setting unit 130.

The target area setting unit 130 sets initial positional coordinates of the reference points that define the projection target area based on the passed detection points of the four-corner markers. In the initial calibration, ultimate positional coordinates of the reference points that define the projection target area are set by a manual operation by a user, for example, based on the positional coordinates of the detection points of the four-corner markers as an origin.

In relation to the manual operation by a user, the input device 170 provides a receiving unit that receives an instruction for shifting the positional coordinates of the reference points that define the projection target area in the initial calibration. For example, while displaying a captured image which is in the middle of imaging on a display of the image processing apparatus 110 and displaying the current position of the reference points and the current projection status on the image, the input device 170 receives an operation for shifting the coordinate point via a shift of a mouse and a cursor by the user to receive an adjustment of the coordinates of the reference points of the projection target area.

The correction coefficient calculator 132 calculates correction coefficients for the multiple projectors 150a to 150c based on the projection target area set by the target area setting unit 130 and the passed calibration points. For the correction coefficients, geometric correction coefficients and correction coefficients for blending of the projection images are calculated and set for the correction processors 114a to 114c. The geometric correction coefficient is a correction coefficient incorporating a geometric correction such as a positioning, a scaling, and a distortion correction. In contrast, the blending coefficient is a correction coefficient for an adjustment of hue and luminance in area overlapping.

The correction processor 114 generates a projection image to output for each projector from the content image which should be projected collectively based on the calculated correction coefficients of various kinds. During the projection mode in which the content image is projected, the switching unit 124 switches to an output from the correction processor 114 and each projection image output unit 116 accordingly outputs the projection image to be provided as a result of the processing of a corresponding correction processor 114.

In the embodiment illustrated in FIG. 1, the image processing apparatus 110 is further provided with a recalibration controller 134, a reference point storage unit 136, and a maintenance notification unit 138.

The recalibration controller 134 performs a control of starting a recalibration processing in response to an event. The recalibration processing includes re-execution of the projection of the calibration-purpose images, the imaging of the projected calibration-purpose images, the extraction of calibration points of each projector 150, and the calculation of the correction coefficients for the multiple projectors 150a to 150c. For the event as a moment of starting the recalibration processing, an event that an operation of explicitly instructing, by a user, a start of a recalibration with respect to the image processing apparatus 110, the projector 150, or the camera 160, is detected, an event that a planned schedule comes, and other events that are defined in advance so that the recalibration processing is started can be listed, for example. For the planned schedule, given predefined timings such as every day, every week, every month, the first day in every month, and a predetermined maintenance day can be listed. For other events defined in advance, an event that the system is started or restarted and an event that an acceleration sensor detects a motion which exceeds a predetermined level in a case where the acceleration sensor and the like are mounted can be listed. In response to the occurrence of such events, it is possible to start the recalibration processing. The recalibration controller 134 configures a control unit in the embodiment.

The reference point storage unit 136 stores the positional coordinates of the reference points used for fixing the projection target area when the correction coefficients are calculated on the occasion of the initial calibration. The positional coordinates of the reference points stored in the reference point storage unit 136 are used as positional coordinates that define four corners of a tentative projection target area in the case where the boundary between the projection area and the background is not clearly defined like the case where projection is performed onto the wall 102 in the recalibration.

In the recalibration, the target area setting unit 130 reads out the reference points stored in the reference point storage unit 136 as reference points in the recalibration and resets the projection target area. The correction coefficient calculator 132 again receives extracted calibration points from the feature point extraction processor 128 in the recalibration and recalculates correction coefficients for the multiple projectors 150 based on the reset projection target area. The reference point storage unit 136, the target area setting unit 130, and the correction coefficient calculator 132 configure a storage unit, a setting unit, and a correction coefficient calculator, respectively in the embodiment.

The maintenance notification unit 138 registers a contact address, set in advance, of an administrator and a maintenance person and transmits a notification of requesting maintenance to the registered contact address when an error occurs in the recalibration. The maintenance notification unit 138 is preferably capable of transmitting information of various kinds and images indicating a situation in which the error occurred in addition to the notification of requesting maintenance. The notification is transmitted as an electronic mail, an SMS (Short Message service) message, and an instant message, for example though not being limited especially. The maintenance notification unit 138 configures a registration unit and a transmission unit in the embodiment.

While the functional units 112 to 138 are realized on the single image processing apparatus 110 in the explanation in the embodiment illustrated in FIG. 2, embodiments of the projection system 100 are not limited to what is illustrated in FIG. 2. In another embodiment, the correction processors 114a to 114c may be realized respectively on the projectors 150a to 150c to reduce a load concentrating in the image processing apparatus in accordance with an increase in the number of units. In still another embodiment, the functional units 112 to 138 may be dispersed and implemented on multiple image processing apparatuses, may be implemented on any one of the projectors 150, or may be configured as a single device provided with the function of the image processing apparatus 110 and the function of the multiple projectors. Moreover, in still another embodiment, the functions of the feature point extraction processor 128, the target area setting unit 130, and the correction coefficient calculator 132 may be implemented as a server that provides the functions as a service via a network.

Entire Processing Flow in Initial Calibration

Figure 5:
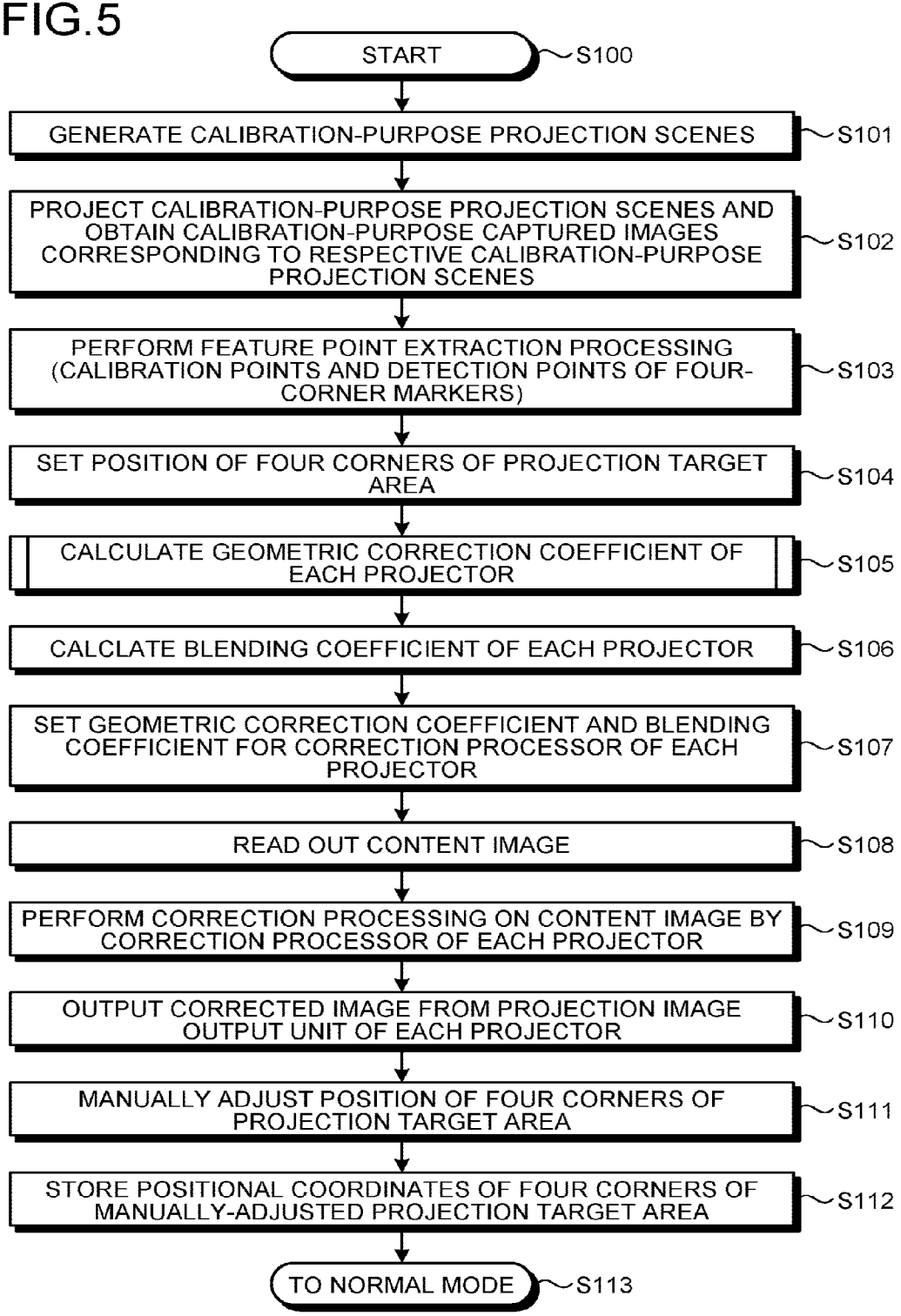
FIG. 5 is a flowchart of a flow of an entire processing in an initial calibration according to the embodiment.

An entire flow of a calibration processing in the initial calibration according to the embodiment will be explained below with reference to the flowchart illustrated in FIG. 5 and the graphical user interface illustrated in FIG. 6. FIG. 5 is a flowchart of a flow of an entire processing of the calibration processing in the initial calibration according to the embodiment. The processing flow illustrated in FIG. 5 is executed in an initial installation of the projector 150 or initially when the layout is changed. While the initial calibration means what provides a calibration state which becomes a reference in the subsequent correction processing and is normally executed in the initial installation or in the layout change, the present invention is not limited thereto. The processing illustrated in FIG. 5 is started from step S100 in response to an instruction, by a user, of starting the calibration processing.

At step S101, the image processing apparatus 110 generates calibration-purpose images to generate calibration-purpose projection scenes based on conditions input by the user. Since a correction in a situation where the boundary between the projection area and the background is not clearly defined is assumed in the embodiment, the conditions input by the user may include a designation on whether or not the boundary is clearly defined to allow another processing flow when the boundary is clearly defined. Here, the explanation will be continued on the assumption that the calibration is performed in the situation where the boundary is not clearly defined. At step S102, the image processing apparatus 110 uses the multiple projectors 150a to 150c to project generated calibration-purpose projection scenes in order and obtains respective calibration-purpose captured images captured by being associated with respective calibration-purpose projection scenes by the camera 160. Details of the calibration-purpose projection scenes and the calibration-purpose captured images will be explained later in relation to a recalibration processing in maintenance after installation.

At step S103, the image processing apparatus 110 executes a feature point extraction processing in which a feature point is extracted from each of the obtained at least one calibration-purpose captured image. Details of the feature point extraction processing will be explained later in relation to the recalibration processing.

At step S104, the target area setting unit 130 receives positional coordinates of the detected detection points of the four-corner markers and sets the positional coordinates of the reference points of the four corners that define the projection target area as initial values. At step S105, geometric correction coefficients of each projector are calculated based on the calculated calibration point coordinates and the reference point coordinates of the projection target area while details of the processing will be explained later. At step S106, the image processing apparatus 110 calculates blending coefficients of each projector. At step S107, the image processing apparatus 110 sets the geometric correction coefficients and the blending coefficients for each projector calculated respectively at steps S105 and S106 for each correction processor 114.

The image processing apparatus 110 reads out a content image to project at step S108 and executes a correction processing in the correction processor 114 for each projector with respects to the content image at step S109. At step S110, the image processing apparatus 110 causes the projection image output unit 116 of each projector to output the corrected projection image for each projector.

Though the steps explained above, the projection target area is once defined by setting the positional coordinates of the detection points of the detected four-corner markers as the initial values for the reference points and a projection image is corrected to fall within the projection target area. At step S111, the target area setting unit 130 receives a manual adjustment of the positional coordinates of the reference points of the respective four corners that define the projection target area based on the reference points (i.e., the detection points), as an origin, of the four-corner markers initially set and sets positional coordinates of the reference points after the adjustment. On this occasion, the user is able to adjust the coordinates of the reference points of the four corners of the content by shifting a mouse and a cursor via the input device 170 under the state where the content is projected.

Figure 6:
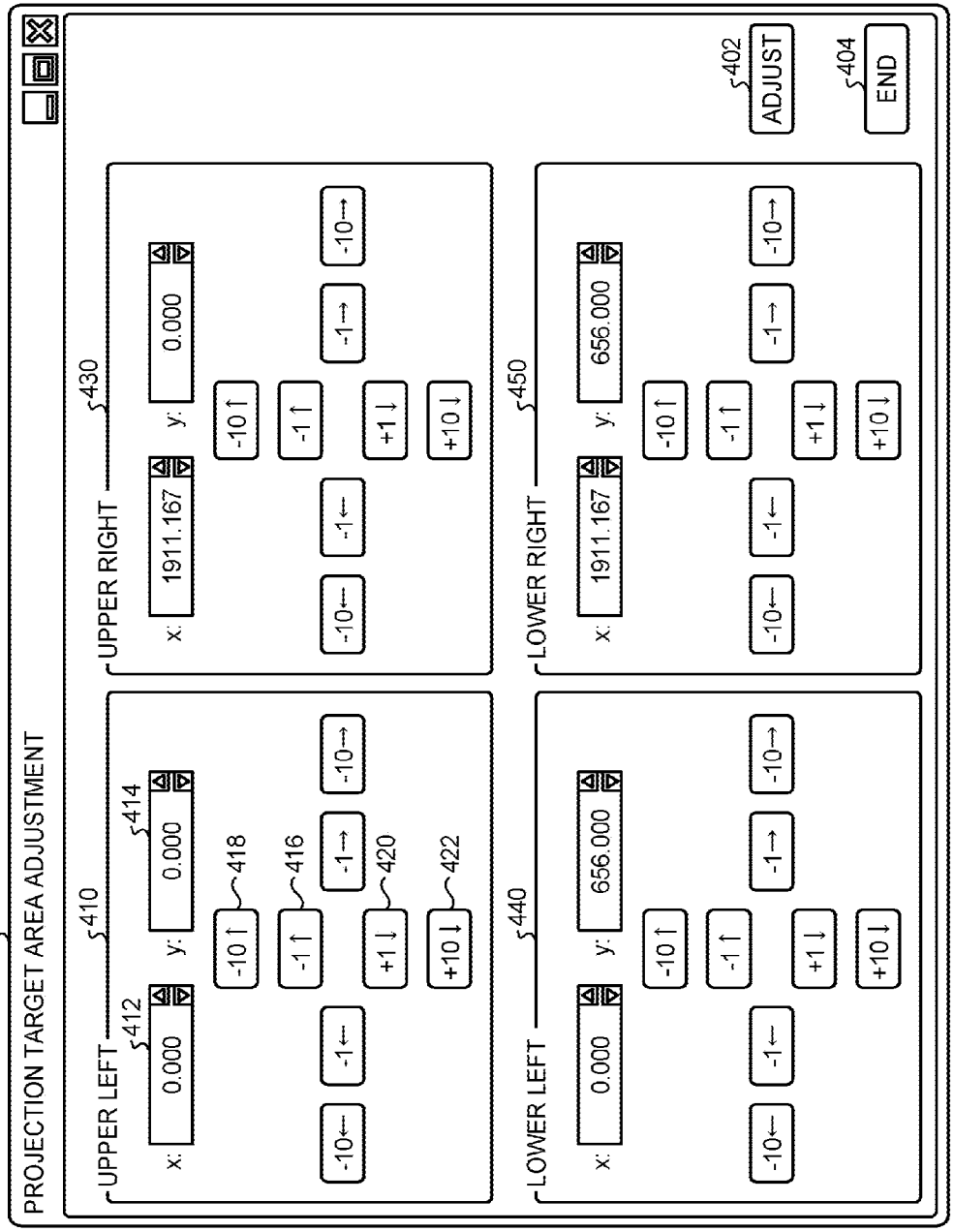
FIG. 6 illustrates an example of a user interface screen for a fine adjustment of positions of four corners of a projection target area in the embodiment.

FIG. 6 illustrates an example of a user interface screen for a fine adjustment of the positions of the four corners of the projection target area in the embodiment. A screen 400 illustrated in FIG. 6 is provided with setting areas 410, 430, 440, and 450 that allow adjusting the coordinate values of each of the four corners, an "ADJUST" button 402 that receives an instruction for reflecting the settings, and an "END" button 404 that receives an instruction for ending the adjustment.

To explain the setting area 410 for the upper left as a representative, each setting area includes text boxes 412 and 414 indicating positional coordinates (x, y) of each of the four corners and buttons 416, 418, 420, and 422 which are components of the user interface that receives an instruction for shifting the positional coordinates of the four corners. Here, a button for a shift to a vertical direction is explained as a representative.

In the user interface screen 400, a fine adjustment amount is changed by granularity over a plurality of plus-minus levels (for example, two levels of +/−10 and +/−1) by the buttons 418 to 422. Alternatively, coordinate values after fine adjustment may be input directly in the text boxes 412 and 414. When the fine adjustment amount of the positions of the four corners of the projection target area is input by the user in this manner and the "ADJUST" button 402 is depressed, the coordinates of the reference points that define the projection target area are updated. After that, the geometric correction coefficients are continuously recalculated and the blending coefficients are recalculated to perform the projection of the content. The user performs a manual adjustment by deforming and fitting in an assumed area the collective projection image while visually checking the projection image after adjustment and depresses the "END" button 404 when satisfied with a result of the adjustment. By the depression of the "END" button 404, the manual adjustment in the initial calibration is ended and the processing moves to step S112.

At step S112, the image processing apparatus 110 stores the positional coordinates of the ultimate reference points, manually adjusted, of the four corners in the initial calibration in the reference point storage unit 136. Then at step S113, the mode shifts to the normal projection mode. The content image is thereby projected within the projection target area as a whole.

Entire Processing Flow in Recalibration after Initial Calibration

The processing flow illustrated in FIG. 5 is executed in the initial installation or in the layout change of the projector 150. A flow of a processing in a recalibration after the initial calibration will be explained below with reference to FIG. 7. Here, the recalibration indicates what is re-executed after the completion of the initial calibration on the basis of the calibration state given in the initial calibration.

Figure 7:
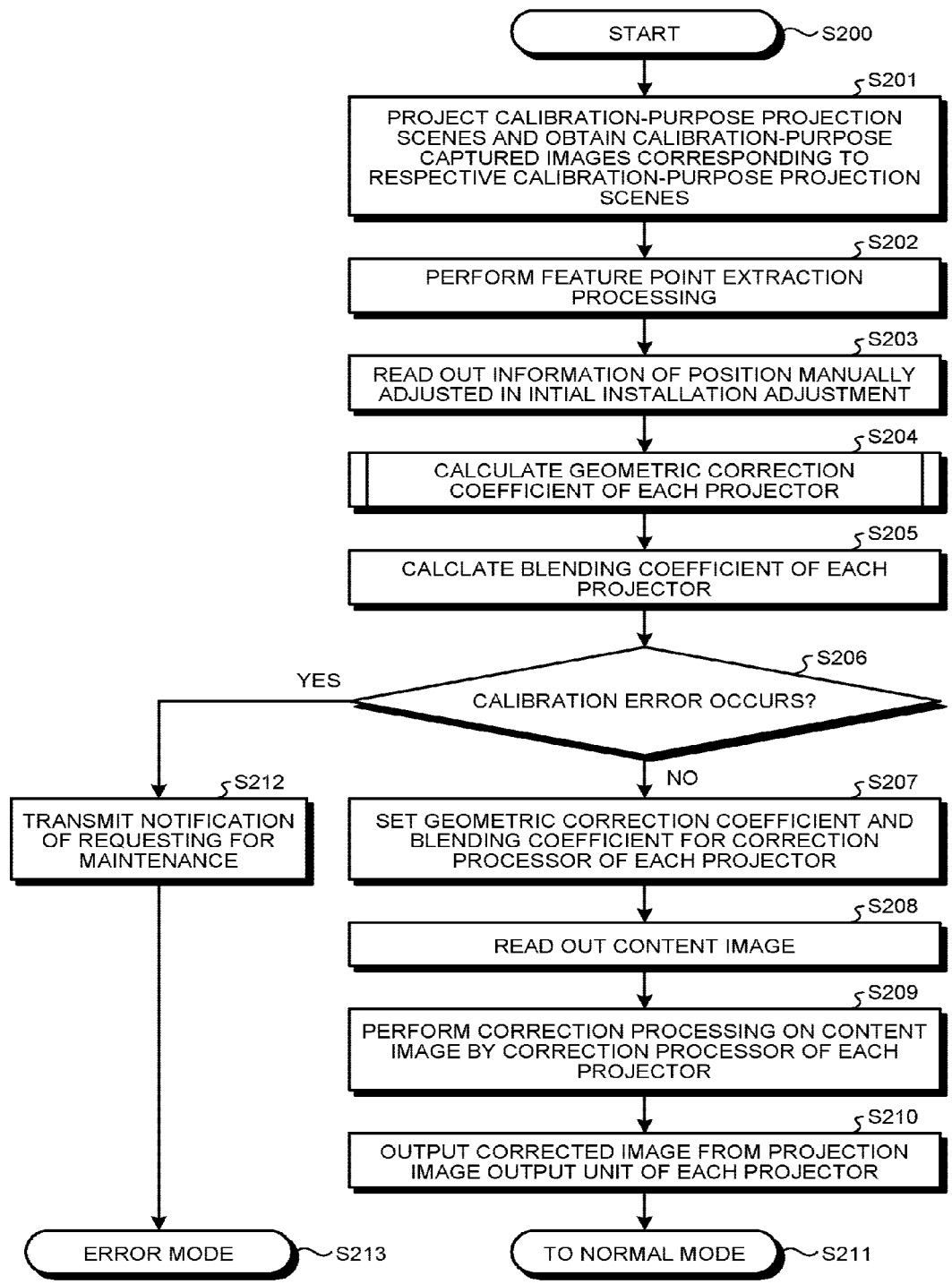
FIG. 7 is a flowchart of a flow of an entire processing in recalibration after the initial calibration according to the embodiment.

The processing illustrated in FIG. 7 is started from step S200 by the recalibration controller 134 in response to an event. For example, the recalibration processing is started in response to an event that an operation of explicitly instructing, by the user, a start of recalibration is detected, an event that a planned schedule comes, and other events that are defined in advance, for example. Here, assumed for the recalibration processing is the example of the permanent secure installation like the hanging from the ceiling of the camera 160 as illustrated in FIG. 2 and the calibration in the situation where the boundary with the background is not clearly defined.

At step S201, the image processing apparatus 110 uses the multiple projectors 150a to 150c to project calibration-purpose projection scenes and obtain calibration-purpose captured images by the camera 160.

Figure 8:
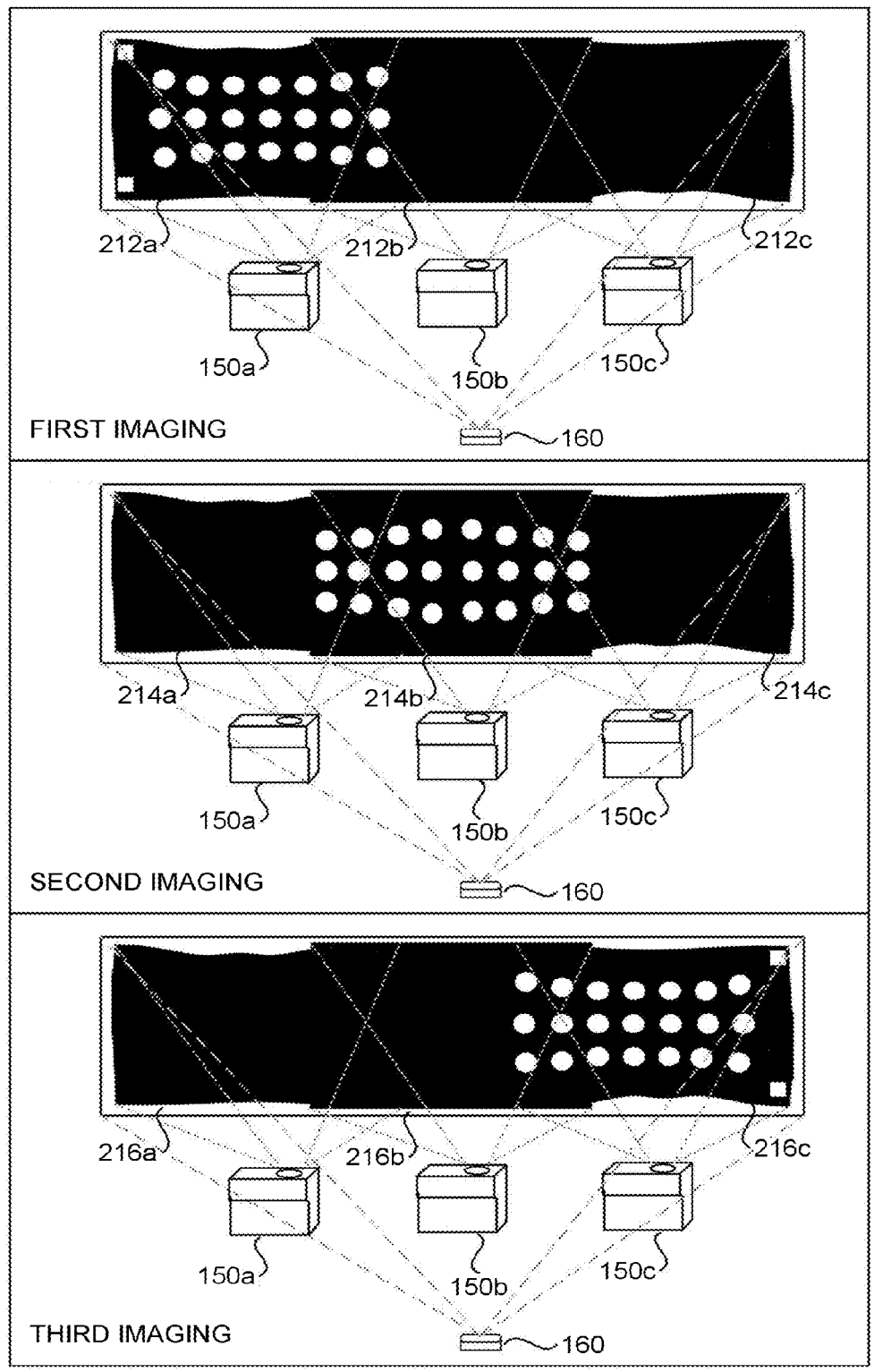
FIG. 8 illustrates an example of calibration-purpose projection scenes which the image processing apparatus according to the embodiment causes multiple projectors to project.

FIG. 8 exemplifies calibration-purpose projection scenes which the image processing apparatus 110 according to the embodiment causes the multiple projectors 150a to 150c to project. In FIG. 8, three calibration-purpose projection scenes as a result of sequential projection, from respective projectors, of the three calibration-purpose images illustrated in (A) to (C) in FIG. 4 are illustrated. Here, while calibration-purpose projection scenes in the recalibration processing will be explained with reference to FIG. 8, the same applies to the calibration-purpose projection scenes in the initial calibration.

In a first calibration-purpose projection scene at the first imaging in the example illustrated in FIG. 8, the image processing apparatus 110 causes the first calibration-purpose image illustrated in (A) in FIG. 4 to be projected from the first projector 150a first and causes no image to be projected from the second projector 150b and the third projector 150c. For the second scene in the second imaging and the third scene in the third imaging, respective calibration-purpose images illustrated in (B) and (C) in FIG. 4 are similarly projected sequentially from the projectors 150b and 150c, respectively. While a given projector projects a calibration-purpose image, no image is projected from the other projectors.

The camera 160 performs imaging more than once at each of the steps explained above by making all of the connected the projection images 212, 214, and 216 respectively of the projectors 150a to 150c fully fall within the angle of view. Calibration-purpose captured images corresponding to respective calibration-purpose projection scenes from the camera 160 are obtained collectively or sequentially by the image processing apparatus 110 and the processing moves to step S202. Alternatively, captured images are distributed by stream from the camera 160 to the image processing apparatus 110 and the image processing apparatus 110 obtains an image of each frame corresponding to each timing at each of the steps explained above.

At step S202, the image processing apparatus 110 executes the feature point extraction processing by which feature points are extracted from each of the at least one obtained calibration-purpose captured image. In the feature point extraction processing, positional coordinates of the set of calibration points of each projector 150 are extracted in the captured image coordinate system. While the processing in the recalibration processing is explained here, the processing in the initial calibration will also be explained. In the initial calibration, positional coordinates of the detection points of the four-corner markers are further extracted in the captured image coordinate system.

In the feature point extraction processing, the image processing apparatus 110 first detects the calibration pattern (circular shapes) of each projection image, of each projector 150, in each captured image and extracts barycentric coordinates the pattern in the captured image coordinate system coordinates as calibration point coordinates (accuracy degree of decimal point, for example). The barycentric coordinates of the circular shapes can be calculated by binarizing the image, cutting out a bulk of white pixels by pattern matching and the like, and calculating the barycentric coordinates thereof. The same applies to the four-corner markers, the barycentric coordinates of the four-corner markers in each captured image coordinate system are detected from a plurality of captured images, and the barycentric coordinates thereof are extracted as coordinates of the detection points of the makers.

Figure 9:
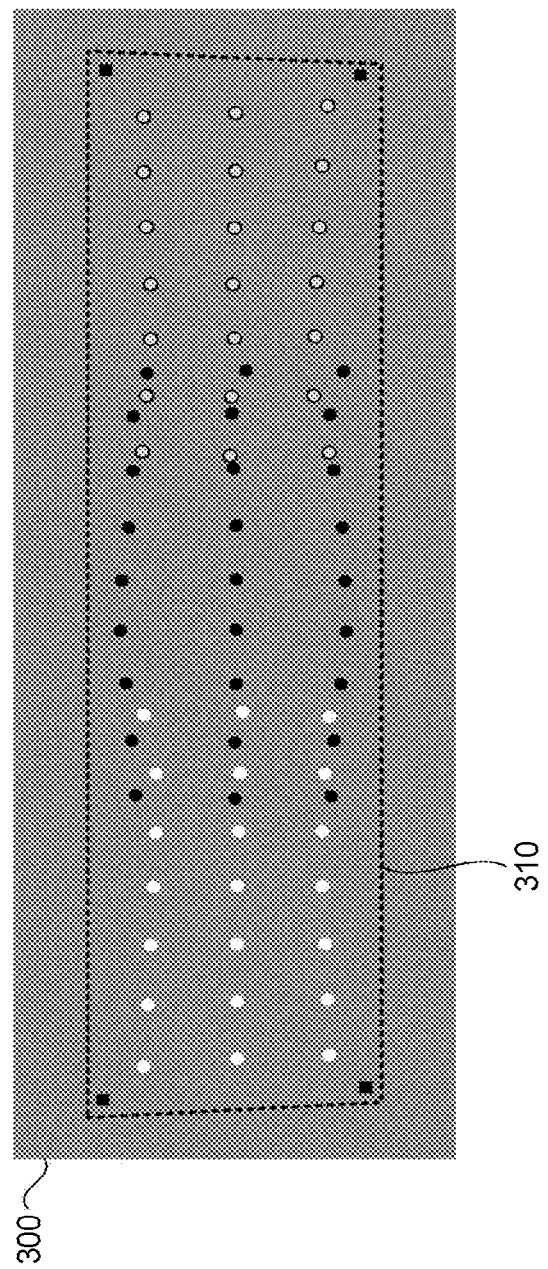
FIG. 9 illustrates a set of calibration points and detection points of four-corner markers, extracted on a coordinate system of a captured image, of each projector.

FIG. 9 illustrates a set of calibration points and detection points of the four-corner markers, extracted on the captured image coordinate system in the embodiment, of each projector. In FIG. 9, calibration points (solid white circles, solid black circles, and white open circles) of the three projectors and detection points (solid black squares) of the four-corner markers detected on a captured image coordinate system 300 are illustrated. Since the imaging is performed by securing the camera 160 in the embodiment here, the coordinates of the calibration points and coordinates of the detection points of the four-corner markers to be obtained are expressed in a single coordinate system.

At step S203, the target area setting unit 130 reads out positional information of the reference points of the four corners, which are stored in the reference point storage unit 136 and manually adjusted in the initial calibration, of the projection target area and sets the positional information as reference points of a tentative projection target area. An area 310 on the captured image coordinate system illustrated in FIG. 9 indicates a projection target area defined by the read reference points of the four corners of the projection target area in the initial calibration on the captured image coordinate system.

Here, while the positional coordinates of the reference points in the initial calibration are used, if the camera 160 is displaced at the same time, there arises a misalignment by the displacement. However, while especially a short focus projector is significantly sensitive to a positional displacement since the projector performs the projection over a very wide field of view from a position close to the wall 102, it is considered, in the case where the camera 160 is permanently secured in a manner of being hung from the ceiling, that a displacement arising in the relatively-light camera 160 that performs imaging from a position away from the wall 102 is relatively small. In other words, since there is a low possibility of causing a misalignment in imaging attributed to the positional displacement of the camera and the captured image coordinate system roughly fits, it is considered that there is no problem even when the positional coordinates of the reference points in the initial calibration are treated without change on the captured image coordinate system in the recalibration. Moreover, when the boundary between the projection area and the background is not clearly defined like the case where the projection is performed on a white wall, it is considered that a slight misalignment as a whole barely matters enough to be ignored as long as a misalignment in images in the connection part is dissolved. Besides, it is considered that there is a low possibility that a slight misalignment of about several pixels among the projection images causes the four-corner positions in the initial installation to be out of the projectable area, the calibration pattern is recognizable, and the recalibration is thereby available.

At step S204, geometric correction coefficients of each projector are calculated based on the calculated coordinates of the calibration points and the reference points of the projection target area. At step S205, the image processing apparatus 110 calculates blending coefficients of each projector.

At step S206, the recalibration controller 134 determines whether or not a calibration error occurred in the recalibration processing. At step S206, when it is determined that a calibration error did not occur and the recalibration ends in success ("No"), the processing moves to step S207. At step S207, the image processing apparatus 110 sets the geometric correction coefficients and the blending coefficients, calculated for each projector respectively at steps S204 and S205, for each correction processor 114.

The image processing apparatus 110 reads out a content image to project at step S208 and executes a correction processing with respect to the content image by the correction processor 114 for each projector at step S209. The image processing apparatus 110 causes the projection image output unit 116 for each projector to output each corrected projection image for each projector at step S210 and the processing shifts to the normal projection mode at step S211.

On the other hand, when it is determined that a calibration error occurred at step S206 ("YES"), the processing moves to step S212. For example, the calibration error occurs when a normal projection and a normal imaging come to be unavailable because there arises a big misalignment that disables an application of the recalibration processing among the plurality of projection images or because there arises a certain trouble and a disturbance in the projector 150 and the camera 160.

Figure 10:
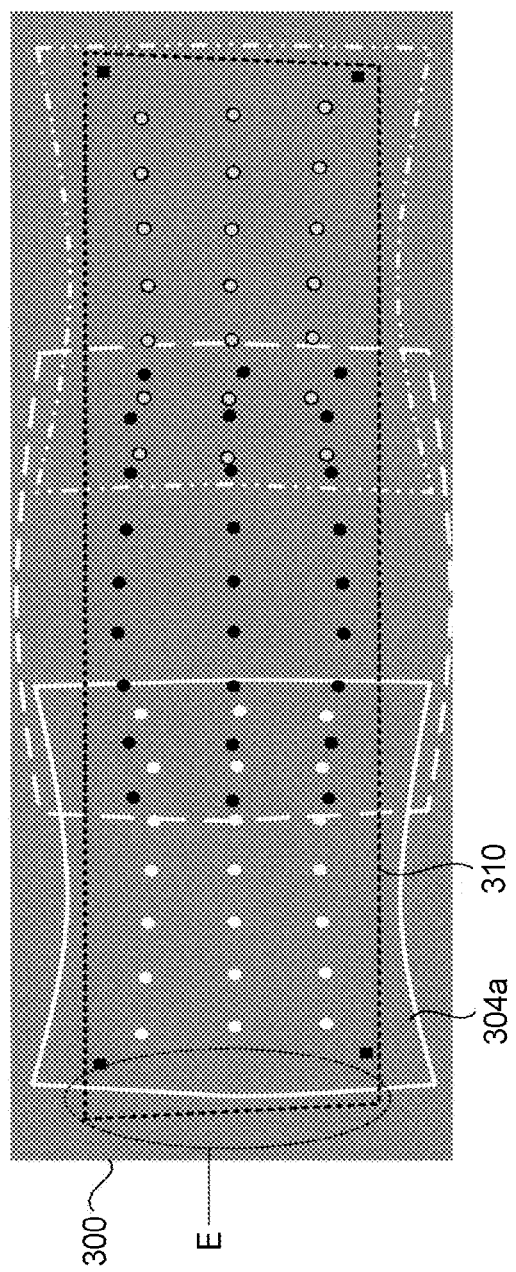
FIG. 10 illustrates a specific example in which a calibration error occurs in a recalibration processing according to the embodiment.

FIG. 10 illustrates a specific example in which a calibration error occurs in the recalibration processing according to the embodiment. The specific example in FIG. 10 illustrates a case (E) where a projectable area 304a, which is a maximum range over which the projector 150 can project (a detection method thereof will be explained later), comes not to satisfy the previous projection target area 310.

In the case as explained above, since the projection target area spreads out of the projectable area, the calculation of the correction coefficients for projection onto the projection target area ends in correction coefficient calculation error. In the example illustrated in FIG. 10, there is a substantial need for a visit at the actual place by a maintenance person, an adjustment of the physical position of the projector 150, and an optical adjustment of the position of the projection images. Beyond that, there is a possibility that the calibration error occurs when a fatal trouble such as an operation stop, attributed to an error due to a runout of a lamp or a temperature increase, occurs in the projector 150 or when a fatal trouble such as a breakdown or a disturbance with noises to the imaging system occurs in the camera 160. In any case, there is high possibility of requiring maintenance by human resources.

So, the maintenance notification unit 138 transmits a notification of requesting maintenance by human resources to the contact address set in advance at step S212 and the processing shifts to an error mode at step S213.

In the notification of request for maintenance, it is possible to attach the following information, so that the maintenance person is able to grasp the reason why the request was made, i.e., because a significant misalignment occurred or because there arises a trouble in the projector 150 and the camera 160 themselves.

In a specific embodiment, it is possible to transmit at least one of (1) captured images capturing the projection state before the recalibration in which the error occurred, (2) calibration-purpose captured images captured in the recalibration, (3) an interim result in the pattern recognition based on the calibration-purpose captured images (calibration points and detection points of the four-corner markers, coordinates of the calculated reference points, and the like), and (4) captured images capturing the projection state after the re-execution (i.e., error state, incomplete calibration state, and a state without correction).

By attaching the information above to the maintenance notification, the maintenance person having received the notification comes to be able to grasp the conditions of the actual place before going for maintenance, the conditions including the fact that the error is attributed not to a displacement in position but to a disturbance, like a runout of a lamp or an external optical incidence, to the captured images of the camera, or the fact that the error is attributed to a displacement in position. Depending on the conditions, it is then possible to encourage the maintenance person to come to the actual place to make the conditions return to the projection state that allows the recalibration via a physical adjustment of the position of the projector 150, an optical method (lens shift function), and the like.

As one example, it is possible to transmit captured images capturing projection images in the case where images in which calibration-purpose images as illustrated in FIG. 8 are inverted such that black pattern lies on a white background are projected from all the projectors 150a to 150c at the state before the recalibration. It thus becomes possible for the maintenance person to grasp the projectable range of each projector 150, the calibration pattern, a relative positional relation with the projection target area in the previous calibration, and the operational status of each projector 150 (normal or not, runout of a lamp or not, and the like, for example).

Since the recalibration processing explained above can be automatically performed only through an instruction for recalibration by the user, it is possible even for a general user on site who is not familiar with the correction work to perform a correction through recalibration easily even in the case where the projection target area is not clearly defined like the projection onto a wall. On that occasion, no time and no effort are required for the setting of the camera 160 onto a tripod, the imaging again with a camera in hand, and a manual fine adjustment of the projection state. Besides, since the recalibration processing explained above can be started regularly like once in every predetermined period, it is possible to regularly re-correct a slight misalignment. Moreover, it becomes possible to correct a slight misalignment automatically without a constant monitoring or a regular monitoring by human resources.

When a calibration error occurs in the recalibration processing, it is possible to notify the administrator or the maintenance person that there is a high possibility that the situation requiring maintenance by human resources has occurred. Besides on this occasion, it is possible to allow the administrator or the maintenance person to grasp, in advance, the status including whether or not the reason why the recalibration failed is a significant positional displacement of the projector or whether or not the reason why the recalibration failed is other troubles (a runout of a lamp, a breakout of the imaging camera, or an addition of noises such as an external optical incidence in imaging).

Calculation of Geometric Correction Coefficients

Figure 11:
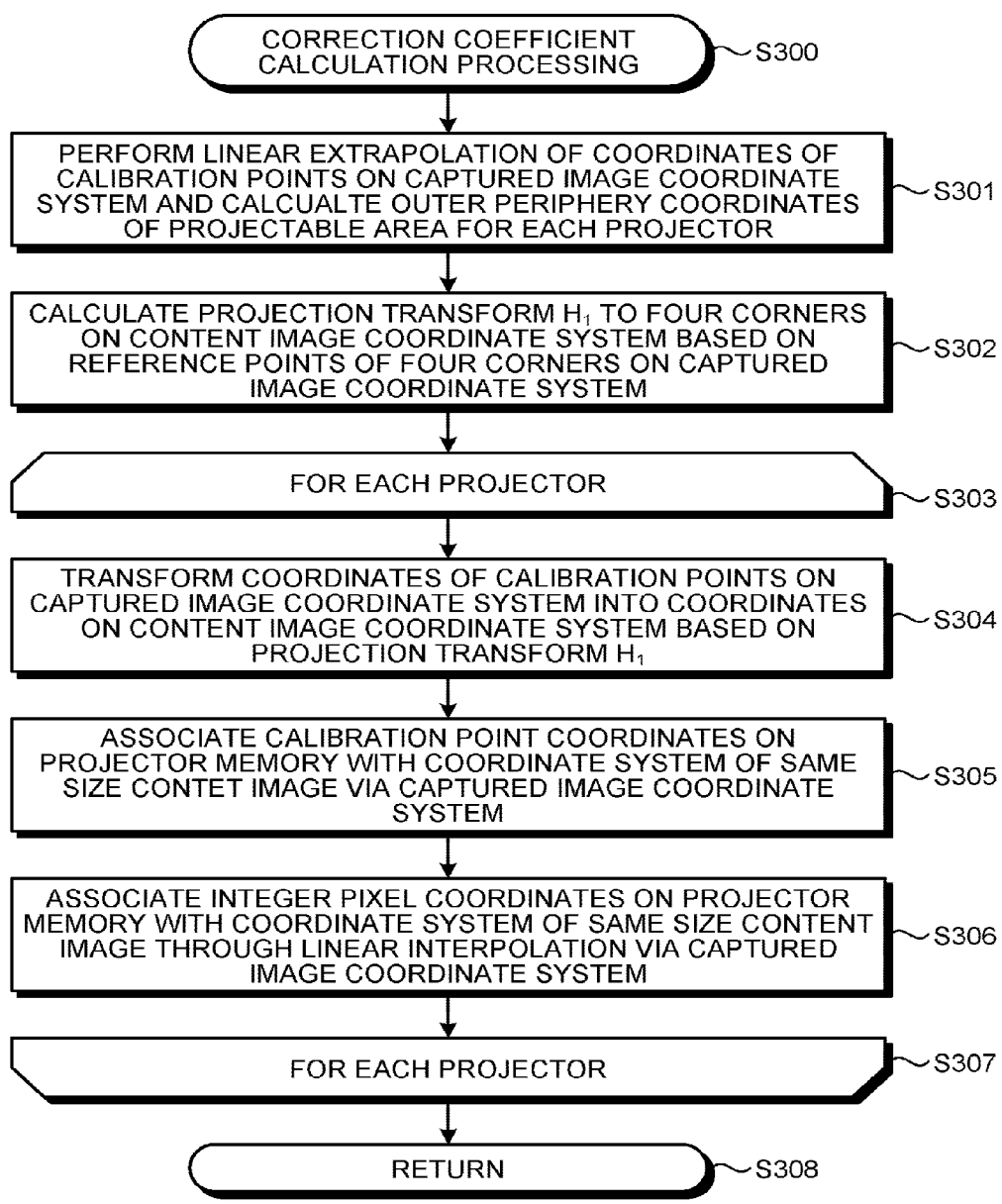
FIG. 11 is a flowchart of a calculation processing, executed by a correction coefficient calculator according to the embodiment, of geometric correction coefficients.

A processing of calculating geometric correction coefficients of each projector will be explained in detail below with reference to FIGS. 11 to 14 and FIG. 16(A). FIG. 11 is a flowchart of a calculation processing, executed by the correction coefficient calculator 132 according to the embodiment, of geometric correction coefficients. The processing illustrated in FIG. 11 is called at one of the step S105 illustrated in FIG. 5 and step S204 illustrated in FIG. 7 and started from step S300.

At step S301, the correction coefficient calculator 132 performs a liner extrapolation of calibration point coordinates on the captured image coordinate system for each projector 150 and calculates outer periphery coordinates of the projectable area of each projector 150.

Figure 12:
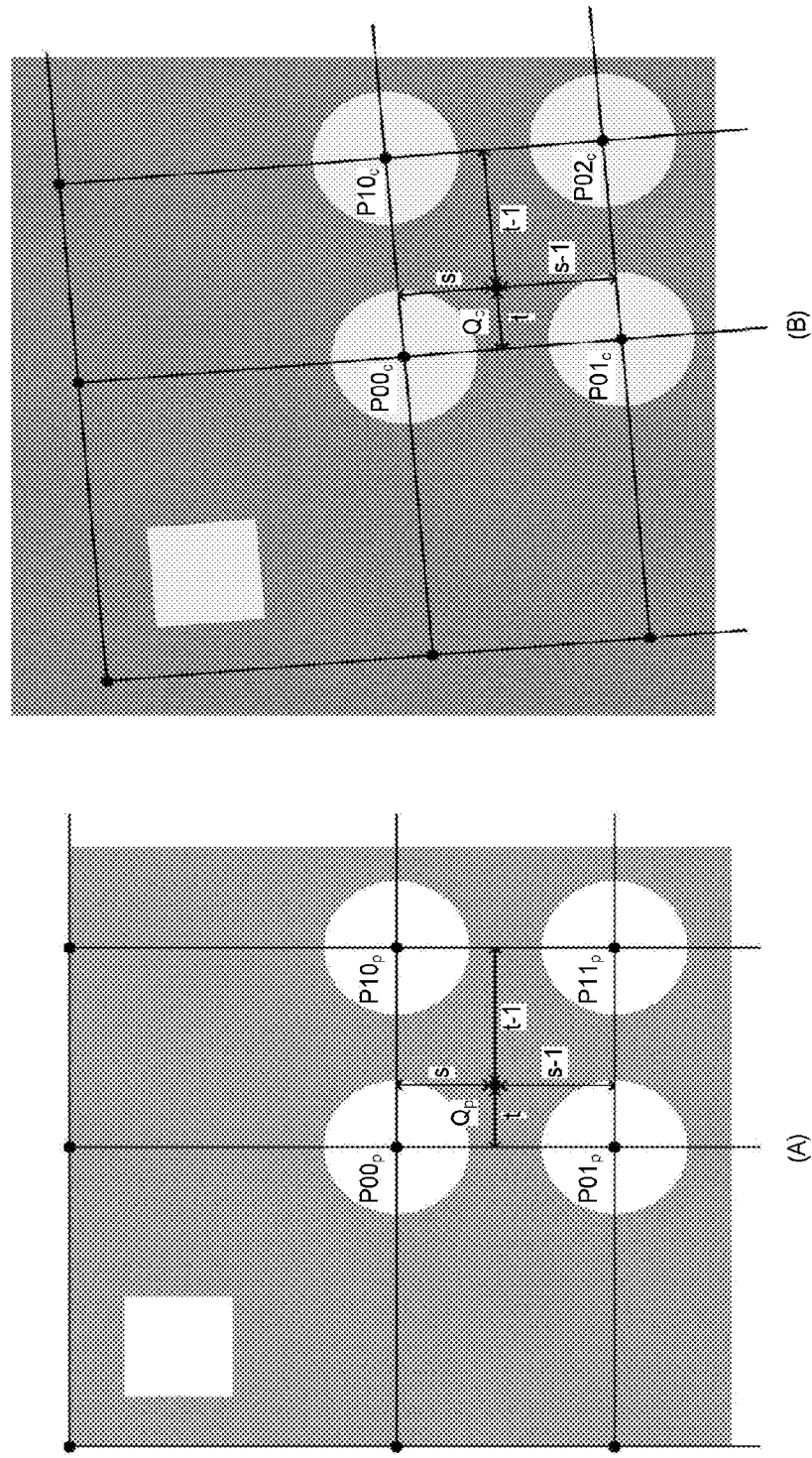
FIG. 12 illustrates a calculation method of outer periphery coordinates of a projectable area by linear extrapolation using calibration point coordinates.

FIG. 12 illustrates a calculation method of outer periphery coordinates of a projectable area by linear extrapolation using calibration point coordinates. In FIG. 12, (A) illustrates four calibration points at the upper left corner on the projector memory and (B) illustrates corresponding four calibration points on the captured image coordinate system. As illustrated in (A) in FIG. 12, outer periphery coordinates on the projector memory (the four corners and the calibration points on the four sides of the projection image of each projector) are set to a position (position at a distance of one and a half times as far as the distance between calibration points, for example) obtained as a result of an extrapolation of a quadrangle patch of the four calibration points (P00$_P$ to P11$_P$, for example) locating in the outer periphery part.

The coordinates of outer periphery pixels for the projectable area of each projector in the captured image coordinate system (four corners and calibration points on the four sides) can be calculated by the linear extrapolation from the four calibration point coordinates locating in the outer periphery part as illustrated in (B) in FIG. 12. Similarly, a point on the coordinate system corresponding to an arbitrary coordinate point on the projector memory other than the outer periphery coordinates (the four corners and calibration points on the four sides) can also be calculated through linear interpolation or the linear extrapolation of adjacent four correction-point coordinates.

Figure 13:
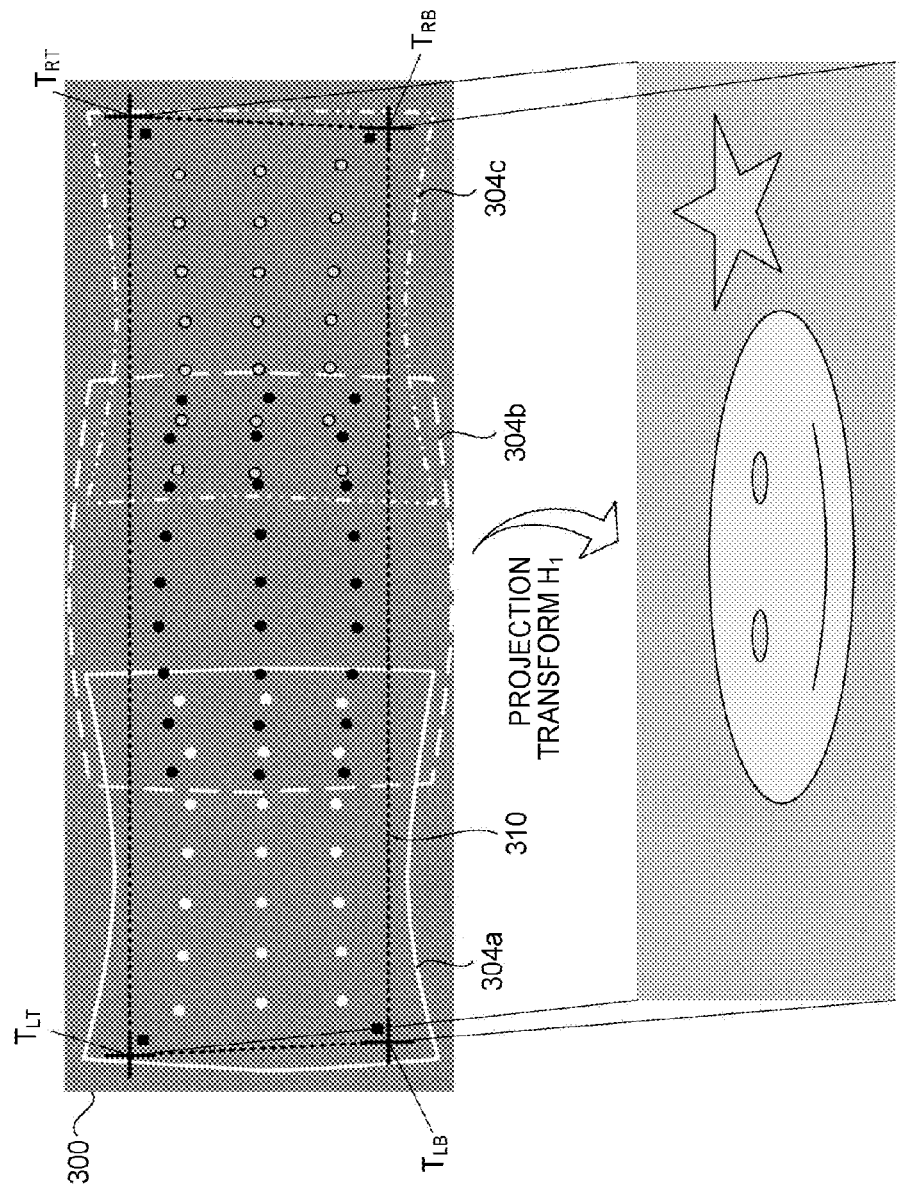
FIG. 13 is an explanatory view of respective projectable areas, a projection target area, and a mapping of a content image of three projectors on captured image coordinate system.

By performing the linear extrapolation explained above for each projection, projectable areas (i.e., a range over which whole blank image is projected and reflected) of the three projectors 150a to 150c are detected on the captured image coordinate system. FIG. 13 illustrates respective projectable areas 304a to 304c of the three projectors detected on the captured image coordinate system 300. An area of a logical addition of the projectable areas of the three projectors is supposed to thoroughly satisfy the projection target area onto which the projection image is to be projected from now on. When the area of the logical addition does not satisfy the previous projection target area, a calibration error occurs in the recalibration.

FIG. 13 also illustrates reference points ($T_{LT}$, $T_{LB}$, $T_{RT}$, and $T_{RB}$) of the four corners on the captured image coordinate system. The target is to project a content image onto the projection target area having a rectangular shape (not necessarily a rectangular shape on the captured image) 310 that is set by positional coordinates which are initially set or manually adjusted as detection points of the four-corner markers in the initial calibration and read out from the reference point storage unit 136 in the recalibration.

With reference to FIG. 11 again, a projection transform is calculated for mapping a rectangular content image onto the projection target area 310 based on the reference point coordinates of the four corners in FIG. 13 at step S302. Here, the projection transform from the projection target area 310 to the content image is treated as $H_1$. The correction coefficient calculator 132 calculates a coefficient for the projection transform $H_1$ from the projection target area 310 to the content image based on the reference point ($T_{LT}$, $T_{LB}$, $T_{RT}$, $T_{RB}$) coordinates that define the projection target area 310 and the coordinates of the four corners of the content image. A calculation method of the projection transform $H_1$ will not be explained in detail here.

In a loop from step S303 to step S307, each processing at steps S204 to S206 is executed for each projector and geometric correction coefficients for each of the multiple projectors are calculated.

At step S304, the correction coefficient calculator 132 transforms the calibration point coordinates on the captured image coordinate system into content image coordinate system by the calculated projection transform $H_1$. The content image attached onto the projection target area 310 on the captured image coordinate system is referred to as "projection content image" and the original content image as a source of the projection content image is referred to as "same size content image".

At step S305, the correction coefficient calculator 132 associates the calibration point coordinates on the projector memory with a pixel position in the coordinate system of the same size content image via the captured image coordinate system. At step S306, the correction coefficient calculator 132 associates an integer pixel coordinates on the projector memory with a pixel position in the coordinate system of the same size content through the linear interpolation via the captured image coordinate system.

Figure 14:
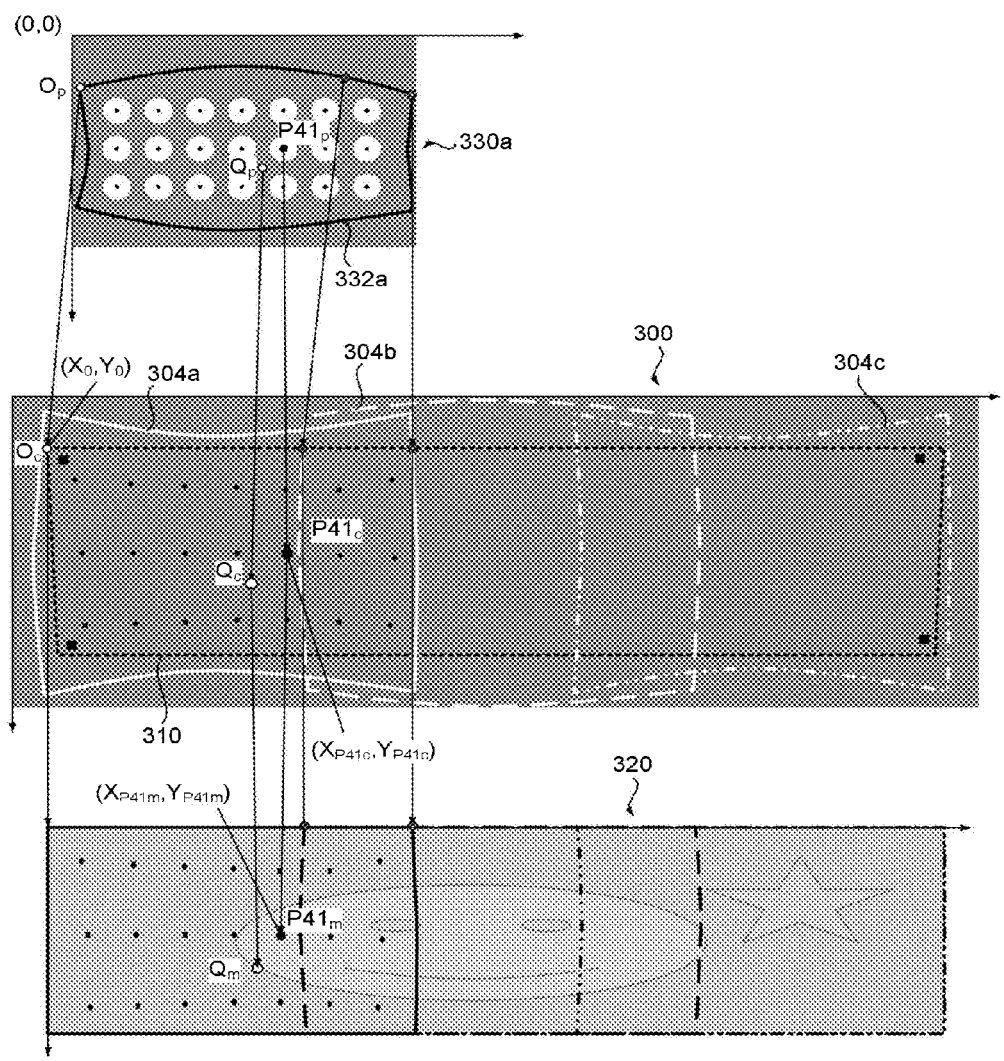
FIG. 14 is an explanatory view of an association of each coordinate on a projector memory and a pixel position, corresponding to a position on a projection content image, on a same size content image.

The geometric correction coefficients to be calculated in each processing at steps S304 to S306 associate each set of coordinates on the projector memory 330 with the pixel position, corresponding to the position on the projection content image, on the same size content image as illustrated in FIG. 14.

To explain one representative calibration point $P41_P$ of the projector memory 330a illustrated in FIG. 14, a corresponding point $P41_C(X_{P41C}, Y_{P41C})$ on the captured image coordinate system 300 is extracted with respected to the calibration point $P41_P$ on the projector memory 330. Since the projection target area 310 of a rectangular shape is mapped onto the content image, a corresponding pixel position $P41_m(X_{P41m}, Y_{P41m})$ on the same size content image is further defined with respect to the positional coordinates $P41_C$ on the coordinate system 300 as illustrated in FIG. 14. Similarly, a corresponding pixel position on the same size content image is calculated similarly with respect to every calibration point $Pij_P$ other than the calibration point $P41_P$ on the projector memory. As for arbitrary coordinates other than the calibration point on the projector memory, a corresponding pixel position on the same size content image can be calculated by the linear interpolation (interpolation or extrapolation in a peripheral part) of a corresponding pixel position on the content image of neighboring 2×2 calibration points. A pixel position of an area which is assigned to the first projector 150a in the content image is thus associated with a pixel of a predetermined area 332a on the projector memory 330a.

In FIG. 16, (A) illustrates a data structure of geometric correction coefficients, calculated in the processing at steps S304 to S306, of one projector. As illustrated in (A) in FIG. 16, corresponding pixel positions, calculated in this manner, on the same size content image with respect to all the pixels of the projector memory become the geometric correction coefficients.

When the association with respect to all the projectors is completed in the loop at steps S303 to S307, the processing moves to step S308. At step S308, the processing is ended and goes back to the caller in FIG. 5 in the initial calibration and to the caller in FIG. 7 in the recalibration.

Calculation of Blending Coefficients

Figure 15:
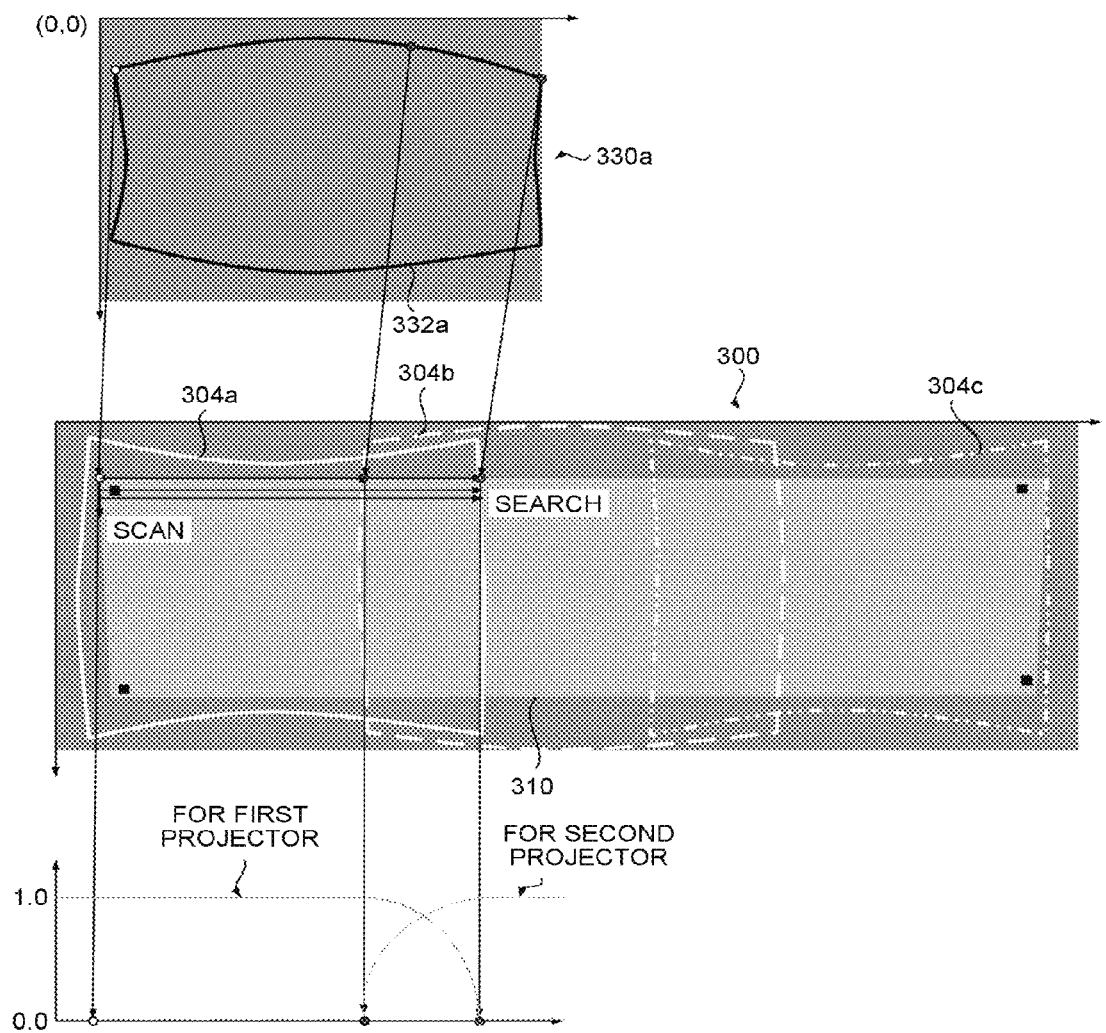
FIG. 15 is an explanatory view of an association of a blending coefficient with respect to each coordinate on the projector memory.

A processing of calculating blending coefficients of each projector 150 will be explained in detail below with reference to FIGS. 15 and 16. FIG. 15 is an explanatory view of an association of a blending coefficient with respect to each set of coordinates on the projector memory. In the calculation processing of the blending coefficients, the processing is executed for each projector of attention and blending coefficients of each of the multiple projectors 150a to 150c are calculated.

First, the correction coefficient calculator 132 detects, based on an outer periphery coordinates of the projectable areas of the projector of attention and the neighboring projector thereof, an overlapping area therebetween. As illustrated in FIG. 15, from an uppermost side of the projection target area 310 in the captured image coordinate system 300, searching is performed rightward from a left origin (white open circle) and is sequentially carried out downward, so that a start point (black solid circle) and an end point (double circle) of the overlapping area between the first projector 150a and the second projector 150b are detected first.

As illustrated in the graph at the bottom in FIG. 15 about the first projector, the blending coefficients for pixels in a range from the origin (white open circle) to the start point (black solid circle) of the overlapping area are settled to one at most. In contrast, the blending coefficients obtained as a result of reverse correction of input/output characteristics of the projector are calculated so that an actual brightness gradually decreases linearly from one to zero depending on a horizontal distance from the start point (black solid circle) as for pixels in the range from the start point (black solid circle) to the end point (double circle) of the overlapping area.

The correction coefficient calculator 132 associates each of integer pixel coordinates on the projector memory with the blending coefficient allotted to the nearest integer pixel of the coordinates (decimal point) in the captured image coordinate system associated by the data structure illustrated in (A) in FIG. 16.

Through the processing explained above, the blending coefficients for all the pixels of the projector memory are to be obtained with respect to each of the multiple projectors 150a to 150c as illustrated in (B) in FIG. 16.

Correction Processing

A correction processing based on the correction coefficients will be explained in detail below with reference to FIGS. 16 and 17. The geometric correction coefficients and the blending coefficients of each projector calculated by the correction coefficient calculator 132 are set for each correction processor 114 at step S107 illustrated in FIG. 5 or at step S207 illustrated in FIG. 7.

The correction processor 114 first prepares association data between each of all the pixels of the projector memory with a corresponding pixel position on the same size content image. Since the pixel positions for all the pixels of the projector memory are obtained as illustrated in (A) in FIG. 16 through the processing by the correction coefficient calculator 132, the correction processor 114 directly reads out the association data.

The correction processor 114 generates an intermediate image via image interpolation methods such as a bilinear and a bicubic from the same size content image to project based on the pixel position (decimal point number) on the same size content image to refer to for each pixel of the projector memory. The intermediate image is an image as a result of a reverse deformation of a detected geometric distortion on the content image by the geometric correction coefficients. The correction processor 114 further multiplies pixel values for R, G, and B of the generated intermediate image by the blending coefficients associated by the association data in (B) in FIG. 16 to generate an ultimate projection image.

Figure 17:
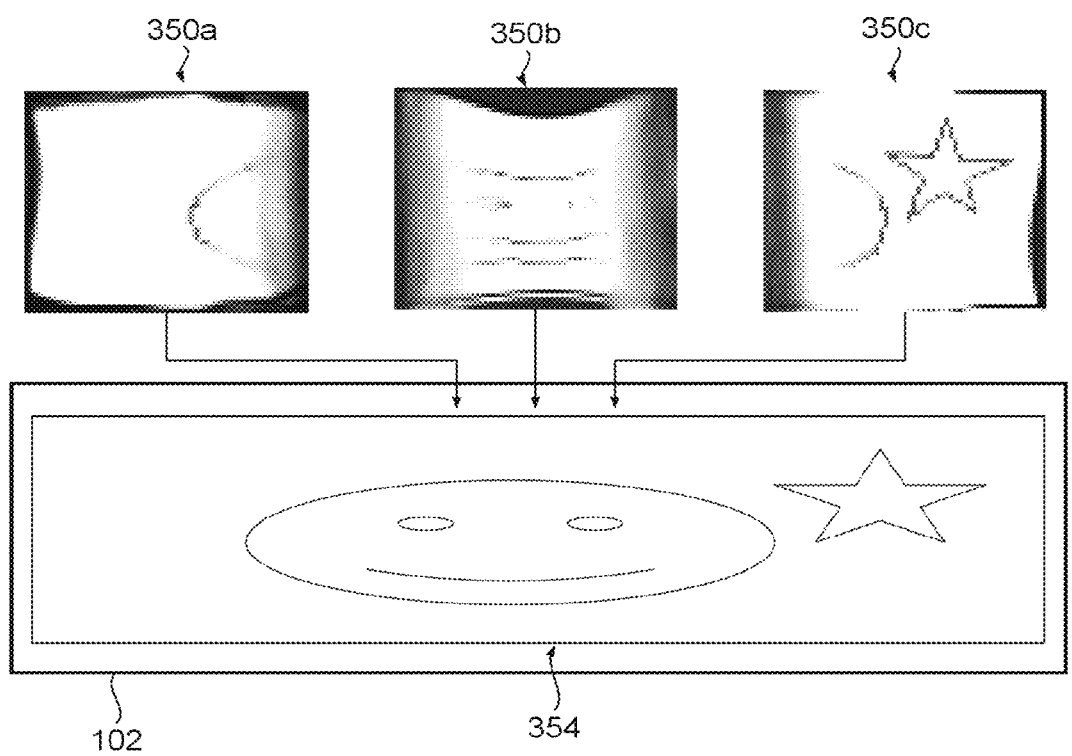
FIG. 17 is an explanatory view of a correction processing, executed by a correction processor according to the embodiment, based on a correction coefficient.

FIG. 17 is an explanatory view of the correction processing based on the correction coefficients. FIG. 17 illustrates projection images 350a to 350c ultimately obtained from the content image by the correction processors 114a to 114c as for the three projectors 150a to 150c. As illustrated in FIG. 17, the projection images 350a to 350c are projected from the projectors 150a to 150c, respectively during the projection mode. The projection images 350a to 350c are overlapped appropriately on the wall 102 and synthesized into a single projection image 354.

Hardware Configuration

Figure 18:
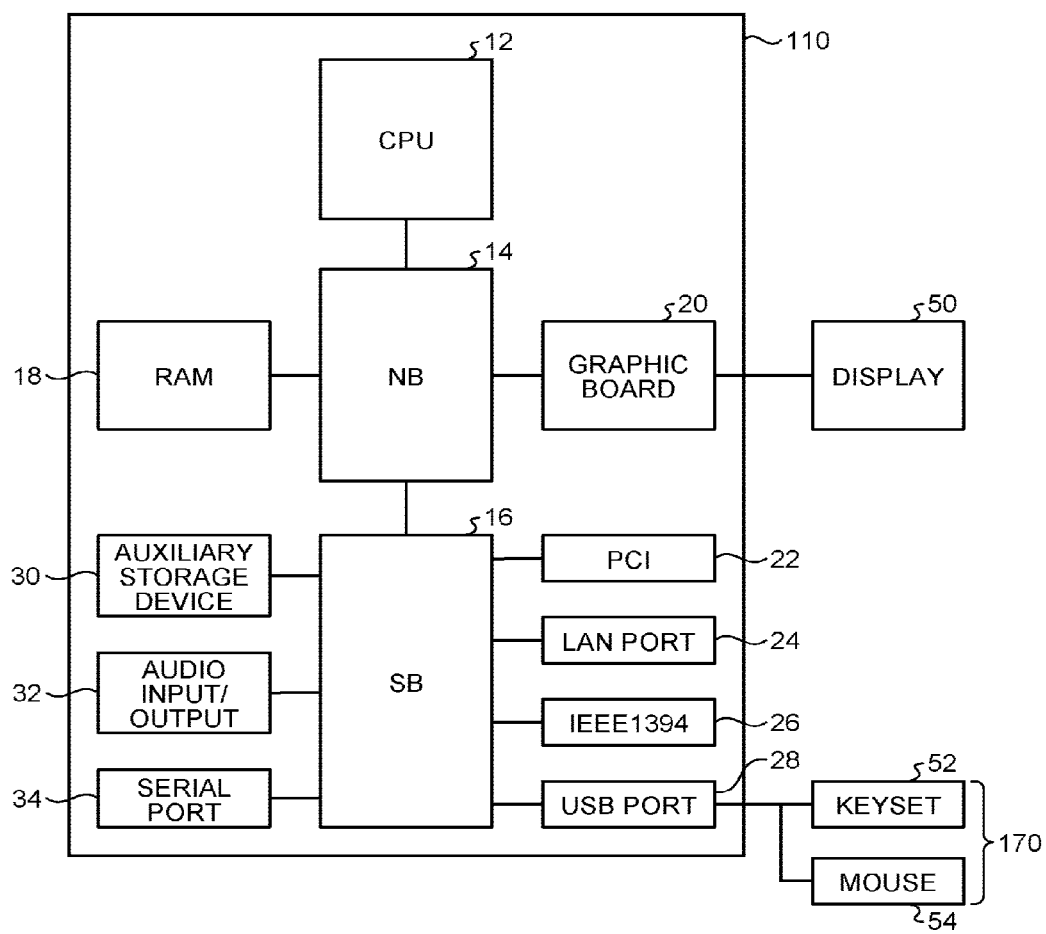
FIG. 18 illustrates a hardware configuration of a universal computer apparatus according to the embodiment.

A hardware configuration of the image processing apparatus 110 according to the embodiment explained so far will be explained below with reference to FIG. 18. The image processing apparatus 110 is typically configured as a universal computer apparatus. FIG. 18 illustrates a hardware configuration of a universal computer apparatus according to the embodiment.

The universal computer apparatus 110 illustrated in FIG. 18 is provided with a CPU 12, a north bridge 14 that connects the CPU 12 and a memory, and a south bridge 16. The south bridge 16 is connected to the north bridge 14 via a dedicated bus or a PCI bus and takes a role of connection with I/O such as the PCI bus and a USB.

To the north bridge 14, a RAM 18 that provides a work area of the CPU 12 and a graphic board 20 that outputs image signals are connected. A display 50 and the projector 150 are connected to the graphic board 20 via an image output interface.

To the south bridge 16, a PCI (Peripheral Component Interconnect) 22, a LAN port 24, an IEEE1394 26, a USB port 28, an auxiliary storage unit 30, an audio input/output 32, and a serial port 34 are connected. The auxiliary storage unit 30, which is an HDD, an SSD, and the like, stores an OS that controls a computer apparatus, programs that realizes the functional units explained above, system information of various kinds, and setting information of various kinds. The LAN port 24, which is an interface device that allows the universal computer apparatus 110 to be connected to a network with wire or wirelessly, is used to transmit the notification of requesting maintenance.

The USB port 28, to which the input device 170 such as a keyset 52 and a mouse 54 may be connected, is capable of providing a user interface that receives inputs of instructions of various kinds, including the instruction of shifting the reference points, from an operator. The universal computer apparatus 110 according to the embodiment reads out from the auxiliary storage unit 30 and expands in the work area provided by the RAM 18 programs, so that the functional units and the processing explained above are realized under the control of the CPU 12. While no specific explanation will be made as for the projector 150 and the camera 160, they are similarly provided with hardware including a CPU, a RAM, and the like and hardware depending on a specific use application.

As explained so far, it is possible in the projection system in which a collective image is projected by multiple projection units according to the embodiment of the present invention to easily re-calibrate a misalignment as a whole, attributed to a positional displacement among the multiple projection units, in a connection part of projection images.

In the explanation so far, the embodiment in which a collective image is projected by horizontally arranging the projection images of the three projectors 150a to 150c in line is explained. However, the multi-projection to which the calibration processing and the recalibration processing according to the embodiment are applied is not limited thereto, and the number of projectors 150 is not limited to three and may be arbitrary. Besides, the projection manner is not limited to the horizontal line, may be a longitudinal arrangement, or may be generalized to an arrangement with two or more lines.

The functional units, which can be realized by computer-executable programs written in legacy programming languages such as assembler, C, C++, and Java®, object-oriented programming languages, and the like, can be distributed by being stored in device-readable storage media such as a ROM, an EEPROM, an EPROM, a flash memory, a flexible disk, a CD-ROM, a CD-RW, a DVD-ROM, a DVD-RAM, a DVD-RW, a Blu-ray Disk®, an SD Card®, and an MO or via a telecommunication line.

According to the embodiment, it is possible in the projection system in which a collective image is projected by multiple projection units to easily re-correct a misalignment, attributed to a positional displacement among the multiple projection units, in a connection part of projection images as a whole.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A projection system, comprising:
    a plurality of projectors configured to together project an image as a whole;
    a receiver configured to receive an instruction for shifting reference points that are defined as positional coordinates of four corners of a projection target area onto which the plurality of projectors together project the whole image on an occasion of an initial calibration processing;

a memory configured to store the reference points of the projection target area used in the initial calibration processing; and processing circuitry configured to
start a recalibration processing in response to an event,
reset the projection target area based on the reference points stored in the memory on an occasion of the recalibration processing, and
calculate correction coefficients for the plurality of projectors based on the reset projection target area,
wherein the processing circuitry is further configured to output a calibration-purpose image including a positioning marker that serves as an indication in positioning to a projector, of the plurality of projectors, assigned to a corner area in the initial calibration processing, and
the receiver receives the instruction for shifting the reference points based on positional coordinates of a detection point of the positioning marker as an origin in the initial calibration processing.

2. The projection system according to claim 1, wherein the event as a moment of starting the recalibration processing is any one of an event in which an operation of explicitly instructing, by a user, a start of recalibration is detected, an event that a planned schedule comes, and an event which is defined in advance so that the recalibration is started.

3. The projection system according to claim 1, further comprising:
a registerer configured to register a contact address set in advance; and
a transmitter configured to transmit a notification of requesting maintenance to the registered contact address when an error occurs in the recalibration processing.

4. The projection system according to claim 3, wherein the transmitter transmits, in addition to the notification of requesting maintenance, at least one of captured images capturing a projection state of the projectors before the recalibration processing in which the error occurred, calibration-purpose captured images in the recalibration processing in which the error occurred, an interim result in a pattern recognition based on the calibration-purpose captured images, and captured images capturing a projection state of the projectors after the recalibration processing in which the error occurred.

5. The projection system according to claim 3, wherein the error occurs when a logical addition of respective projectable areas of the plurality of projectors in the recalibration processing does not satisfy the projection target area defined by the reference points used in the initial calibration processing.

6. An image processing apparatus for projecting an image as a whole through communication with a plurality of projectors, comprising:

a receiver configured to receive an instruction for shifting reference points that are defined as positional coordinates of four corners of a projection target area onto which the plurality of projectors together project the whole image on an occasion of an initial calibration processing;
a memory configured to store the reference points of the projection target area used in the initial calibration processing; and
processing circuitry configured to
start a recalibration processing in response to an event,
reset the projection target area based on the reference points stored in the memory on an occasion of the recalibration processing, and
calculate correction coefficients for the plurality of projectors based on the reset projection target area,
wherein the processing circuitry is further configured to output a calibration-purpose image including a positioning marker that serves as an indication in positioning to a projector, of the plurality of projectors, assigned to a corner area in the initial calibration processing, and
the receiver receives the instruction for shifting the reference points based on positional coordinates of a detection point of the positioning marker as an origin in the initial calibration processing.

7. A non-transitory computer-readable storage medium with an executable program stored thereon to project an image as a whole through communication with a plurality of projectors when the program is executed by a computer, wherein the program instructs the computer to perform a method comprising:
receiving an instruction for shifting reference points that are defined as positional coordinates of four corners of a projection target area onto which the plurality of projectors together project the whole image on an occasion of an initial calibration processing;
storing the reference points of the projection target area used in the initial calibration processing;
starting a recalibration processing in response to an event;
resetting the projection target area based on the stored reference points on an occasion of the recalibration processing; and
calculating correction coefficients for the plurality of projectors based on the reset projection target area,
wherein the method further includes outputting a calibration-purpose image including a positioning marker that serves as an indication in positioning to a projector, of the plurality of projectors, assigned to a corner area in the initial calibration processing, and
the receiving step comprises receiving the instruction for shifting the reference points based on positional coordinates of a detection point of the positioning marker as an origin in the initial calibration processing.

* * * * *